United States Patent [19]

Kang

[11] Patent Number: 5,270,836
[45] Date of Patent: Dec. 14, 1993

[54] RESOLUTION CONVERSION OF BITMAP IMAGES

[75] Inventor: Henry R. Kang, Fairport, N.Y.
[73] Assignee: Xerox Corporation, Stamford, Conn.
[21] Appl. No.: 981,720
[22] Filed: Nov. 25, 1992
[51] Int. Cl.$^5$ .............................................. H04N 1/40
[52] U.S. Cl. ..................................... 358/459; 358/448; 382/54; 382/47
[58] Field of Search ............... 358/400, 401, 447, 448, 358/452, 455, 456, 458, 459, 461, 471; 382/41, 49, 50, 54, 47

[56] References Cited

U.S. PATENT DOCUMENTS

| | | | |
|---|---|---|---|
| 4,484,188 | 11/1984 | Ott ........................ | 340/728 |
| 4,486,785 | 12/1984 | Lasher et al. ............ | 358/284 |
| 4,742,553 | 5/1988 | Irwin ...................... | 382/47 |
| 4,771,471 | 9/1988 | Kitamura ................ | 382/41 |
| 4,945,351 | 7/1990 | Naiman ................... | 340/793 |
| 4,970,604 | 11/1990 | Coueignoux ............ | 358/426 |
| 4,975,785 | 12/1990 | Kantor ................... | 353/447 |

Primary Examiner—Edward L. Coles, Sr.
Assistant Examiner—Jerome Grant, II
Attorney, Agent, or Firm—Oliff & Berridge

[57] ABSTRACT

A method for improving the quality of bitmap image includes repeated iterations of doubling the resolution of an image and smoothing the doubled image. The doubling and smoothing steps are repeated until the intermediate image has a resolution which is greater than a desired resolution of an output image. After generating such an intermediate resolution image, the intermediate resolution image has its resolution reduced to the desired resolution by area mapping to generate a pseudo-gray scale image. The pseudo-gray image is then further processed to further improve the image quality, and then is converted to a true gray scale image or a binary image having the desired resolution.

15 Claims, 25 Drawing Sheets

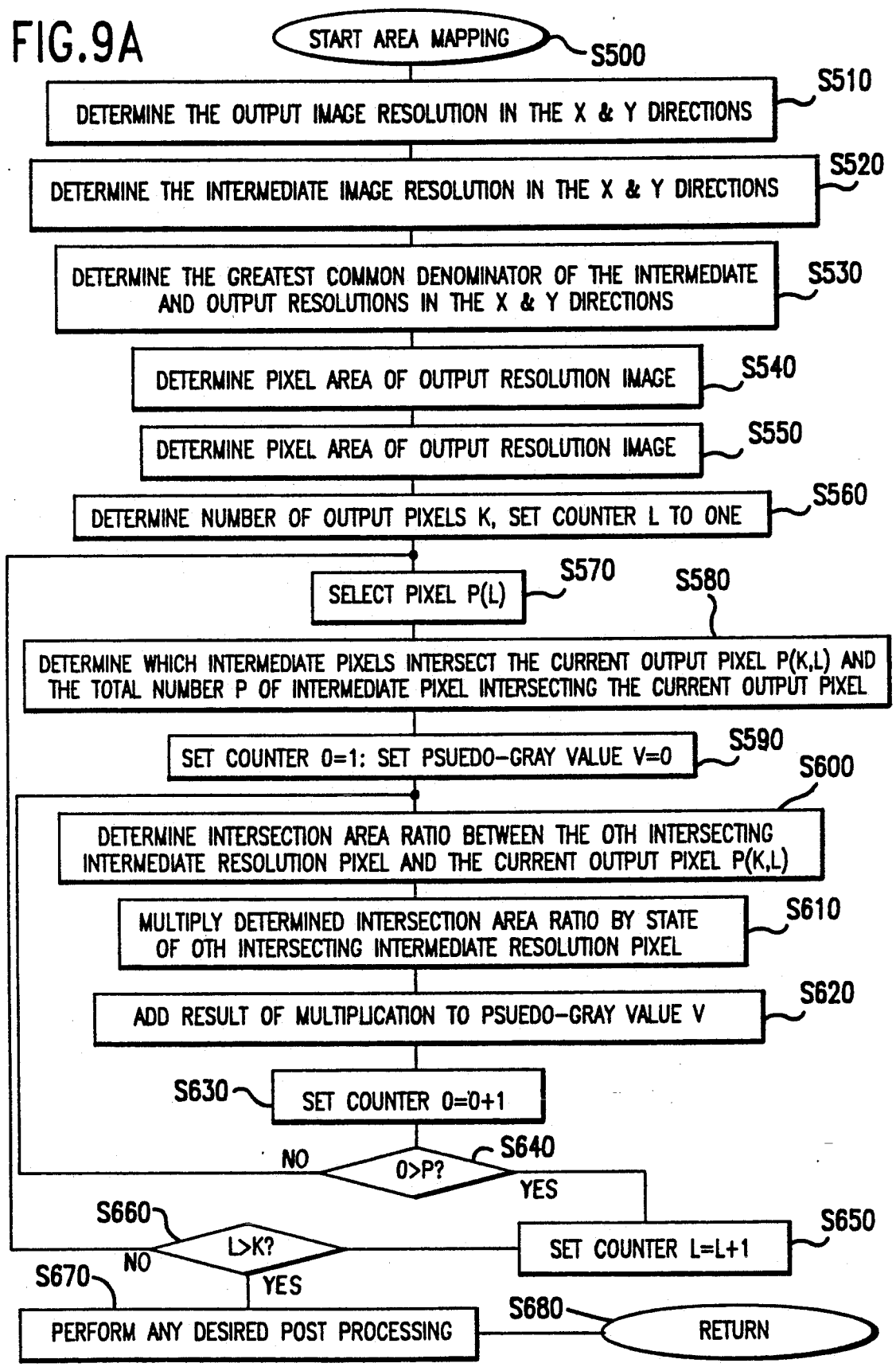

FIG.10A

|   | j+1 | j | j−1 |
|---|---|---|---|
| i−1 | C | B | A |
| i | F | E | D |
| i+1 | I | H | G |

FIG.10B

|   | j+1 | j | j−1 |
|---|---|---|---|
| i−1 | A | D | G |
| i | B | E | H |
| i+1 | C | F | I |

FIG.10C

|   | j+1 | j | j−1 |
|---|---|---|---|
| i−1 | G | H | I |
| i | D | E | F |
| i+1 | A | B | C |

FIG.10D

|   | j+1 | j | j−1 |
|---|---|---|---|
| i−1 | I | F | C |
| i | H | E | B |
| i+1 | G | D | A |

FIG.10E

|   | j+1 | j | j-1 |
|---|---|---|---|
| i-1 | C | B | A |
| i | F | E | D |
| i+1 | I | H | G |

FIG.10F

|   | j+1 | j | j-1 |
|---|---|---|---|
| i-1 | A | B | C |
| i | D | E | F |
| i+1 | G | H | I |

FIG.10G

|   | j+1 | j | j-1 |
|---|---|---|---|
| i-1 | G | H | I |
| i | D | E | F |
| i+1 | A | B | C |

FIG.10H

|   | j+1 | j | j-1 |
|---|---|---|---|
| i-1 | I | H | G |
| i | F | E | D |
| i+1 | C | B | A |

RESOLUTION CONVERSION OF BITMAP IMAGES

FIELD OF THE INVENTION

The present invention relates to converting the resolution of an image having an input resolution bitmap to an output image having an output resolution bitmap, and more particularly to a method for converting a low resolution input image to a high resolution output image by iteratively doubling and smoothing the input resolution until it reaches an intermediate resolution exceeding the desired output resolution, then reducing the intermediate resolution to the output resolution.

BACKGROUND OF THE INVENTION

Image output apparatus, such as drop on demand ink jet printers, laser printers and the like, form images on an image medium as a bitmap of picture elements or "pixels". The pixel bitmap represents the images as a planar array binary digit, where a "0" represents a white pixel and a "1" represents a black pixel (or vice versa). It is often the case that the input image to be transmitted to the image output apparatus is of a lower bitmap resolution than the maximum image bitmap resolution the image output apparatus is capable of producing.

Accordingly, it is highly desirable to convert the low resolution input image to a higher resolution output image before outputting the image to the image output apparatus. U.S. Pat. No. 4,975,785 to Kantor discloses a method for resolution conversation whereby an input resolution of 240 pixels per inch by 240 pixels per inch is converted to an output resolution of 480 pixels per inch by 480 pixels per inch. The input image having the input bitmap resolution is converted to an output image having the output bitmap resolution by taking each pixel of area $a_i$ and dividing it into 4 output pixels of area $a_o$, where $a_o = a_i/4$. Once the input pixels are converted to output pixels, it is necessary to "smooth" the output image to take advantage of the finer resolution. Kantor uses a smoothing method taught in U.S. Pat. No. 4,437,122 to Walsh et al. Walsh et al. teaches a method for reducing the stair-stepping in a converted image by selectively replacing each pixel of the input resolution image by a particular 3×3 pattern of pixels to obtain an output resolution image having a 1:3 resolution conversion.

SUMMARY OF THE INVENTION

It is therefore an object of the present invention to provide a method for resolution conversion by iteratively doubling and smoothing an input image having an input resolution until an intermediate resolution is obtained which exceeds a desired output resolution.

It is another object of the present invention to provide an method for resolution conversion wherein the resolution of the intermediate image exceeding the desired image resolution is reduced to the desired resolution by area mapping.

BRIEF DESCRIPTION OF THE DRAWINGS

The preferred embodiments to the invention are described in detail with reference the following figures, wherein:

FIGS. 9A–9B show flowcharts illustrating the area mapping and grey scale conversion of steps of the present invention;

FIGS. 10A–10D show the first variation of the preferred embodiments of the smoothing step of the present invention;

FIGS. 10E–10H show the second variation of the preferred embodiments of the smoothing step of the present invention;

DETAILED DESCRIPTION OF THE PREFERRED EMBODIMENTS

It has been determined by the inventor of the present invention that image quality of an output image can be improved, by decreasing an intermediate image to the maximum resolution of the particular image output apparatus from a resolution greater than the maximum resolution, over the image quality of an output image formed by directly converting an input image from a lower resolution to the maximum output resolution.

For example, an input image with a resolution of 200 pixels (dots) per inch by 200 pixels (dots) per inch (200×200 dpi) is to be input to a image exposure apparatus, such as a laser printer, having a maximum output resolution of 600 dots per inch by 600 dots per inch. A first output image is generated by directly converting the 200×200 dpi image to a 600×600 dpi image and then smoothing the directly converted image to create the output image.

Figure 6:
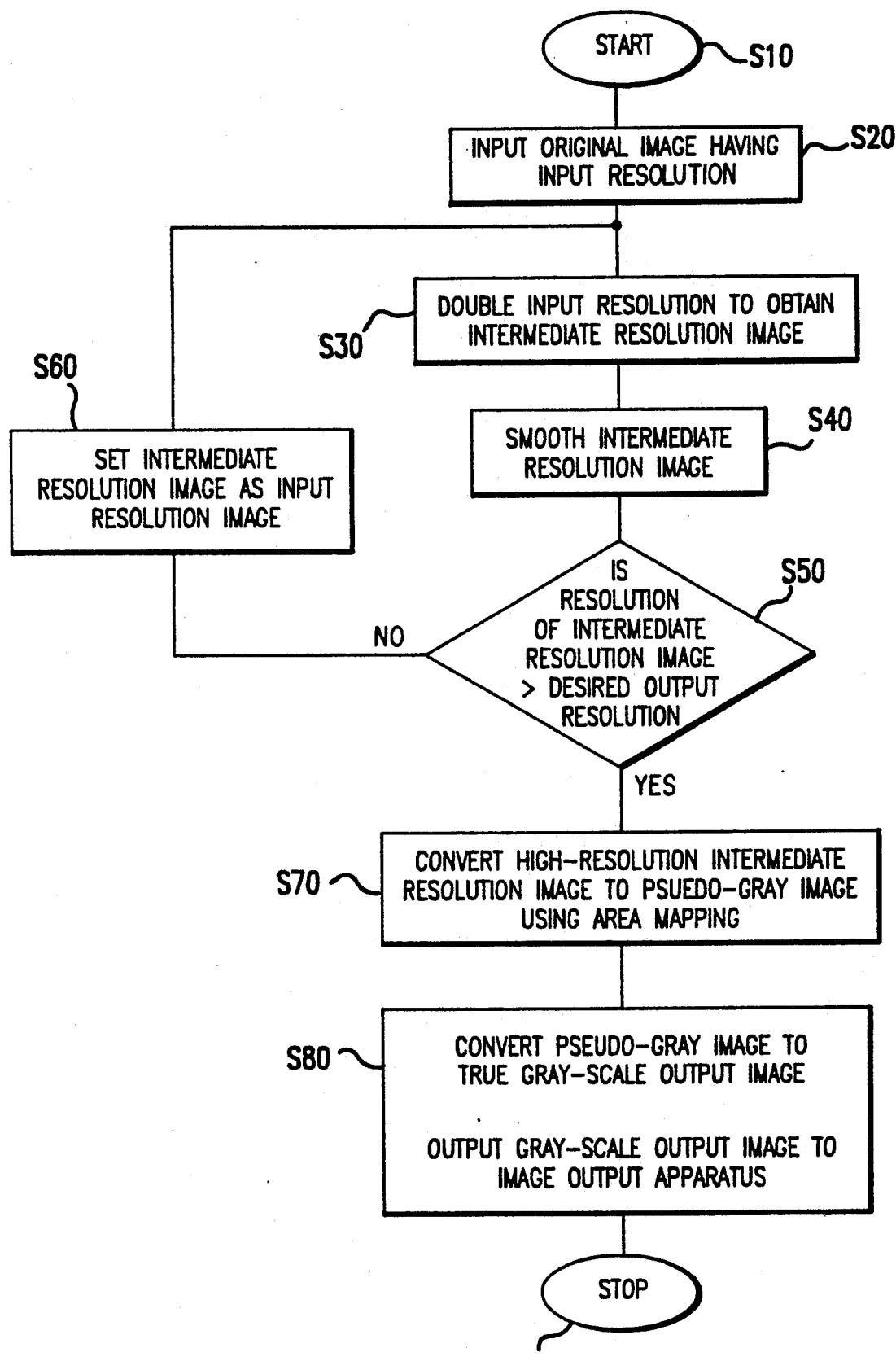
FIG. 6 is a flowchart showing the method for resolution conversion of the present invention.
Figure 7A:
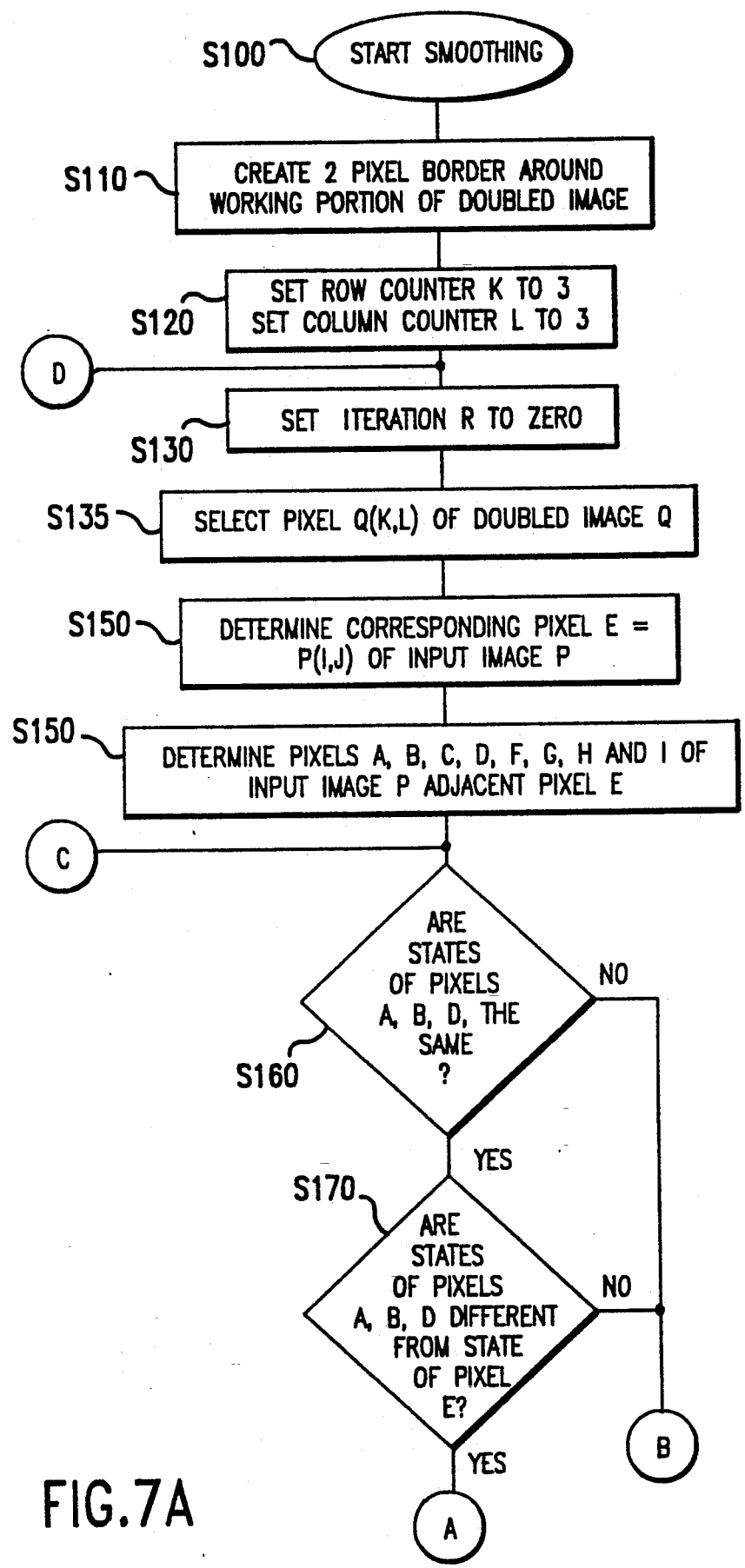
FIGS. 7A–7D show a flowchart of the first embodiment of the smoothing step of the present invention.
Figure 7B:
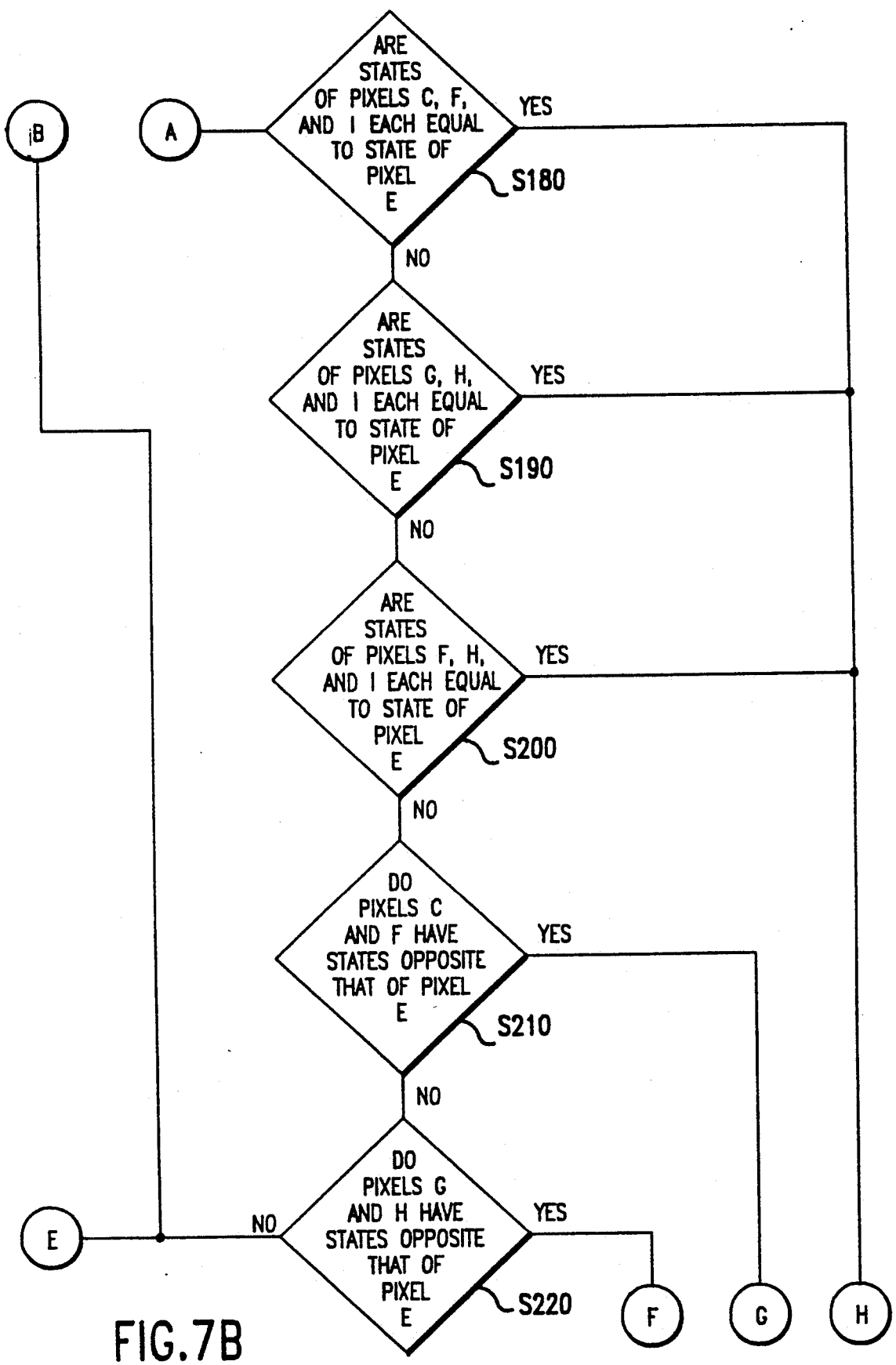
Figure 7C:
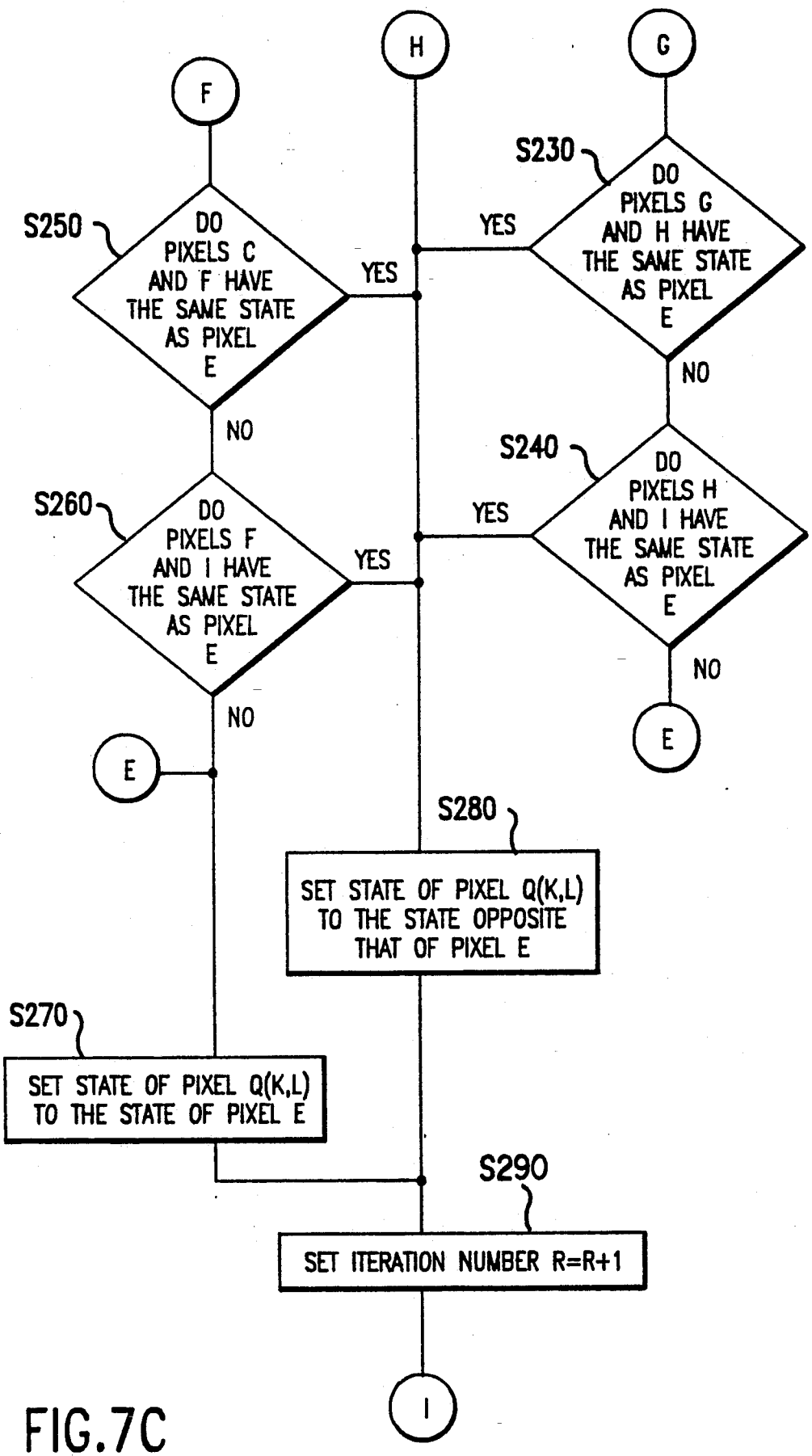
Figure 7D:
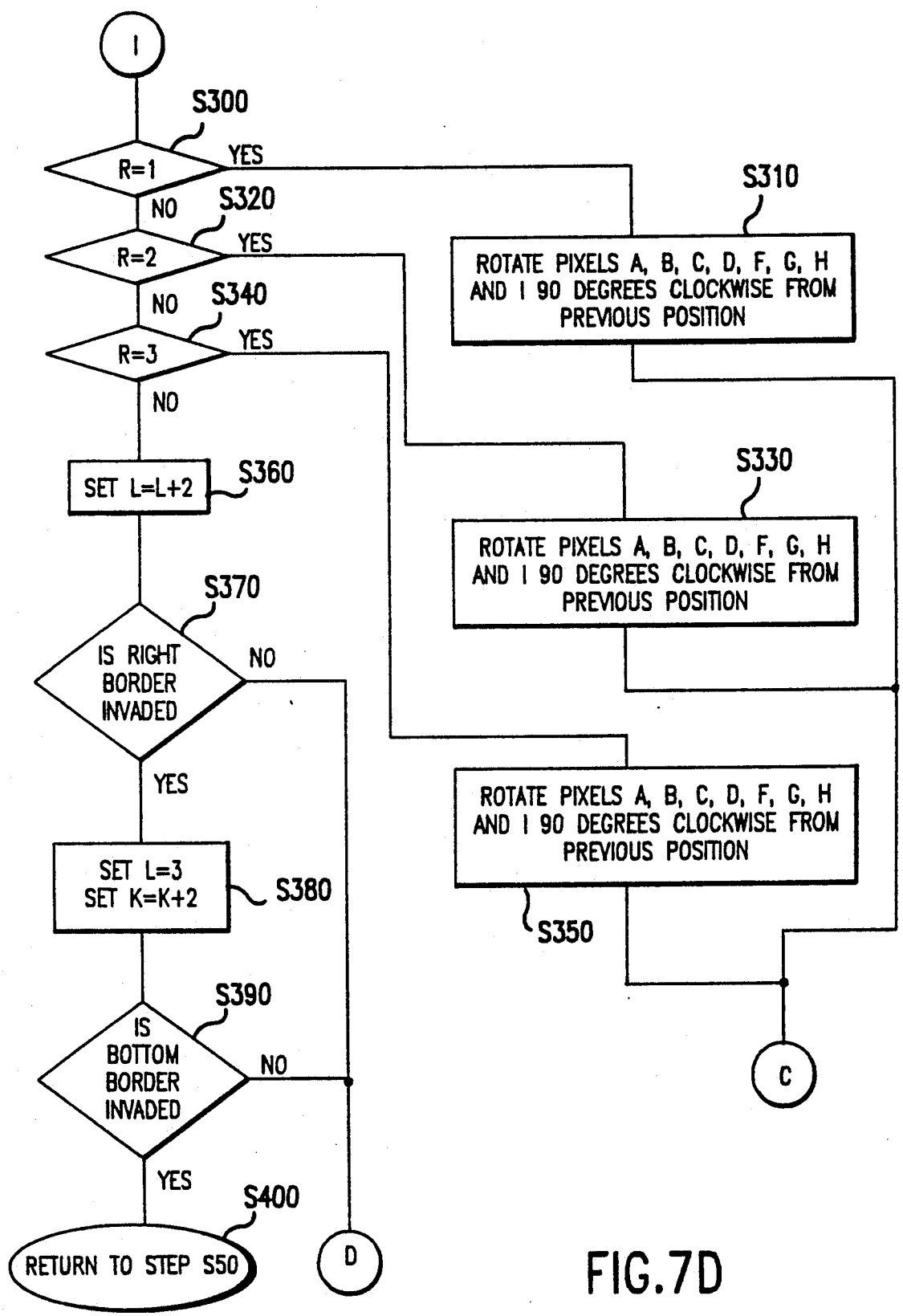

In contrast, using the method for resolution conversion of the present invention, as set forth in the flowchart shown in FIG. 6, the original image would be input in step S20 and its resolution would be doubled, to 400×400 dpi in the above example, in step S30. This intermediate resolution input image would then be smoothed in step S40 to form a first intermediate image. Preferably, the smoothing step would use one of the two preferred embodiments of the present invention set forth below. However, any known smoothing method can be used.

After smoothing in step S40, a determination is made, in step S50, whether the resolution of the intermediate image exceeds the desired output resolution. If the desired output resolution is not have exceeded, as in the above example, in step S60 the intermediate image is set as the input image and returns control to step S340 for another doubling and smooth iteration. In the above example, this would double the resolution of the first intermediate image to 800×800 dpi. This second intermediate resolution input image would then be again smoothed, in step S40, to form a second intermediate image and the determination in step S50 would again be made.

In the above example, as the resolution of the intermediate image now exceeds the desired output resolution, as required in step S50, control jumps to step S70, where the intermediate image is converted to the output image by reducing the resolution of the intermediate image to a pseudo-grey output image having the desired output resolution. In the reducing step of the present invention, the reduction is made by area mapping. However, any known resolution reduction method can be used.

After the intermediate image is converted to the pseudo-grey output image, any known grey scale methods, such as area diffusion, medium filter, high pass filter, low pass filter, or averaging can be used to further improve the output image. Finally, in step S80, the pseudo-grey output image is converted to the actual output image by a grey scale conversion.

Figure 1:
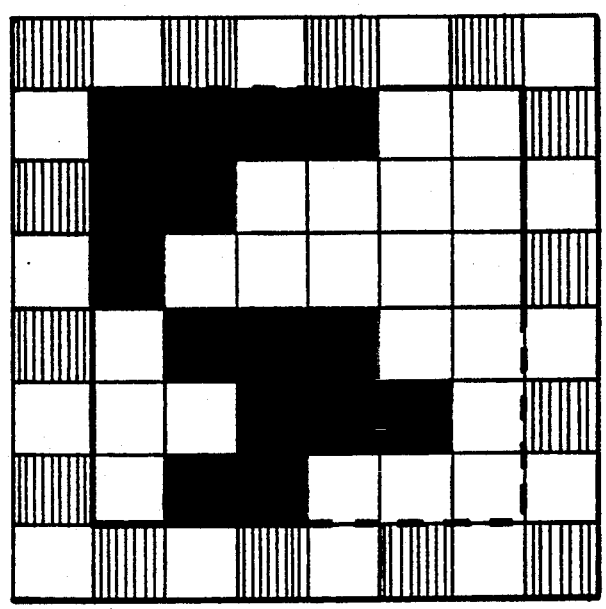
FIG. 1 is a representative portion of an input image representing figure.

FIG. 1 shows a representative portion of an input image having an input resolution, in arbitrary length units q, of 6 pixels (dots) per unit length q(dpq). For purposes of the following discussion, it is assumed that the area shown in FIG. 1 surrounded by a border of alternating white and black pixels. It is also assumed, for the purposes of the following discussion, that the image of FIG. 1 is to be output by a first image exposure apparatus having a maximum resolution of 8 dpq and by a second image exposure apparatus having a maximum resolution of 16 dpq.

The smoothing step, S40 will now be described in greater detail with respect to the flowcharts shown in FIGS. 7A–7C and 8A–8C and the illustrations of FIGS. 1–5B.

Figure 2A:
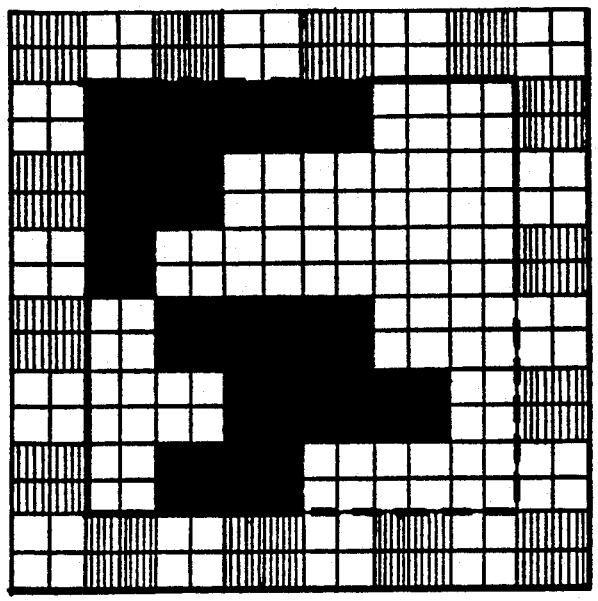
FIG. 2A shows the representative portion of FIG. 1 after a first doubling step using the first embodiment of the present invention.
Figure 2B:
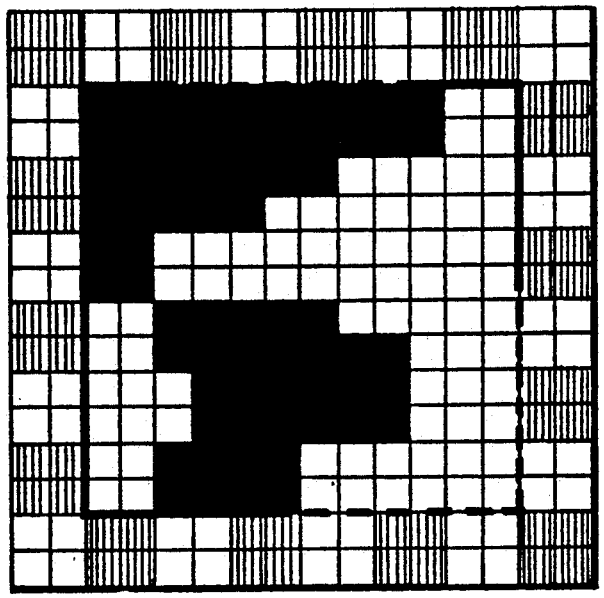
FIG. 2B is a representative portion of FIG. 2A after a first smoothing step.
Figure 2C:
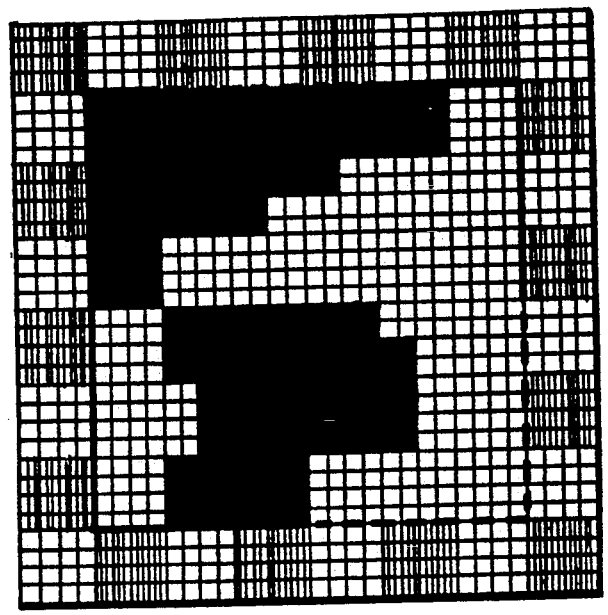
FIG. 2C is the representative portion of FIG. 2B after a second doubling step.
Figure 2D:
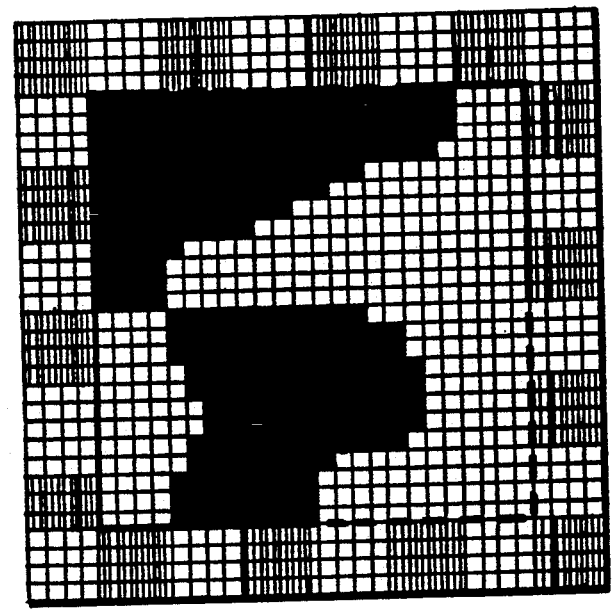
FIG. 2D shows the representative portion of FIG. 2C after a second smoothing step.

A first embodiment of the smoothing step S40 is set forth in FIGS. 7A–7D. FIG. 1 shows the original input image Q having an input resolution of 6 dpq. FIG. 2A shows the doubled input image P for the first iteration, after the resolution has been doubled but before the smoothing step. FIG. 2B shows the once doubled/-smoothed image Q' after the smoothing step of the first iteration, for the first preferred embodiment of the smoothing step. FIG. 2C shows the image, P' of FIG. 2B after the second doubling step. FIG. 2D shows the twice doubled and smoothed image Q". The first preferred method for smoothing a doubled image $Q^s$ has two variations. The first variation is illustrated in FIGS. 10A–10D. The second variation of the first preferred embodiment of the smoothing step is illustrated in FIGS. 10E–10H. It should be noted that while the first and second variations are different ways of performing the first (or second) preferred embodiment of the smoothing step, the smoothed image ultimately produced is the same for both variations.

Figure 3A:
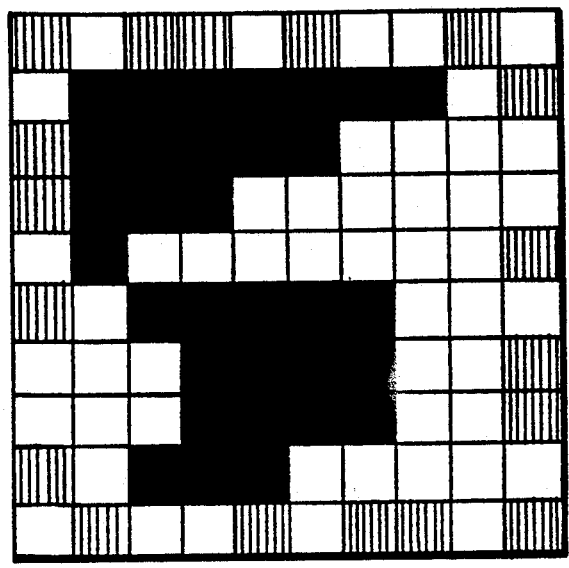
FIGS. 3A–3B illustrate the area mapping step of the present invention as applied to FIGS. 2C–2D.
Figure 3B:
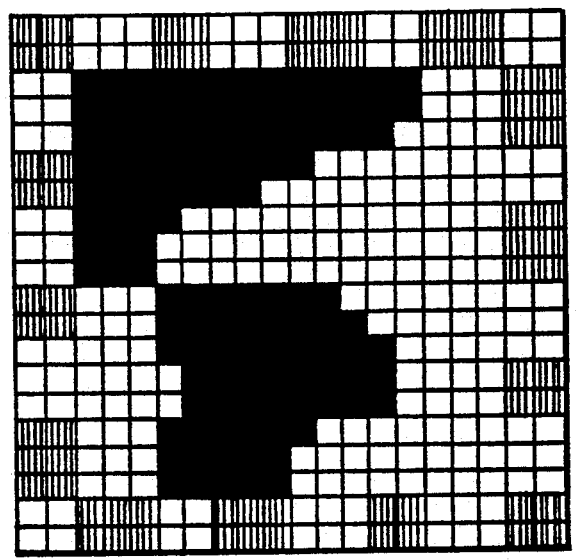
Figure 4A:
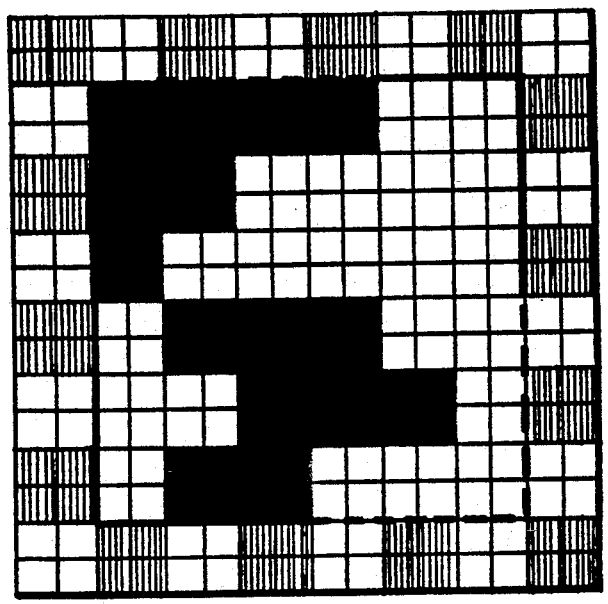
FIG. 4A shows the representative portion of FIG. 1 after a first doubling step using the second embodiment of the present invention.
Figure 4B:
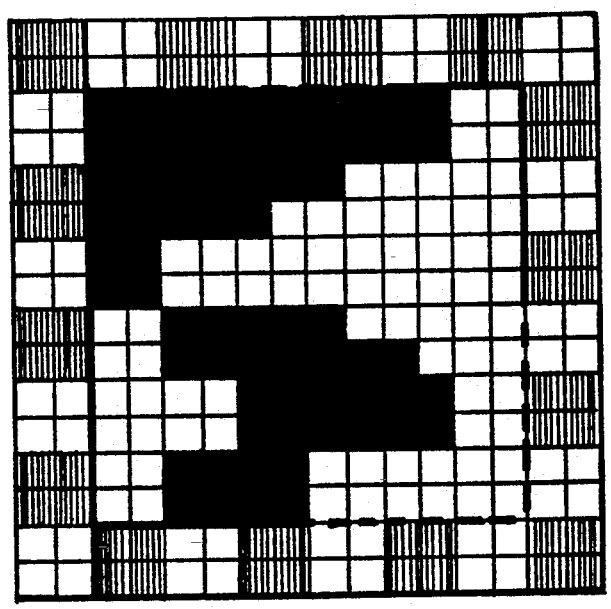
FIG. 4B shows the representative portion of FIG. 4A after a first smoothing step.
Figure 4C:
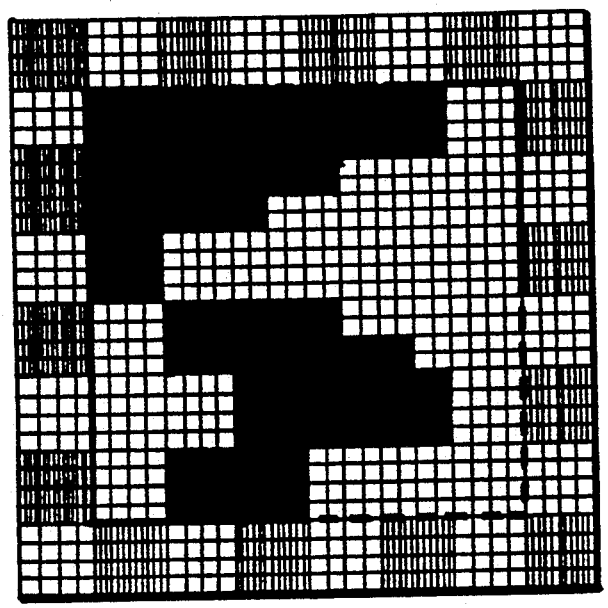
FIG. 4C shows the representative portion of FIG. 4B after a second doubling step.
Figure 4D:
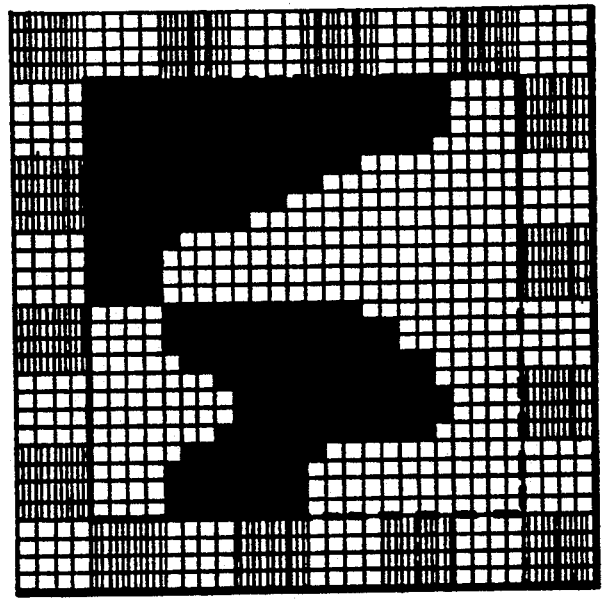
FIG. 4D shows the representative portion of FIG. 4C after a second smoothing step.
Figure 5A:
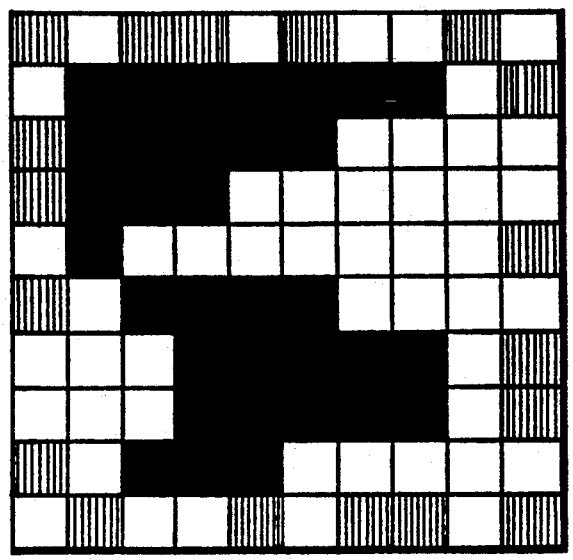
FIGS. 5A–5B illustrate the area mapping step of the present invention as applied to FIGS. 4C–4D.
Figure 5B:
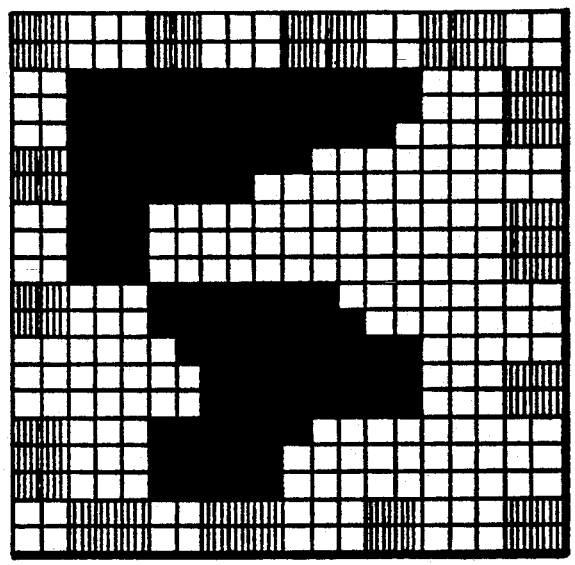

In step S110 of the first preferred embodiment of the smoothing step, a two pixel border is defined in the doubled image, as shown in FIG. 1, to provide a working portion of the doubled image. Accordingly, if the pixel located in the upper lefthand corner of the doubled image in FIGS. 2A and 3A, is defined as the origin (0,0) pixel with the columns I extending horizontally across from 0 to m and the rows k extending vertically downward from 0 to n, a pixel $Q_{k,l}$ of a doubled image $Q^r$ at the origin is pixel $Q_{0,0}$. Accordingly, the area of the doubled imaged to be subjected to the smoothing operation ranges from (l+2) to (m−2) down and from (k+2) to (n−2) across. Additionally, m and n are doubled after each iteration r.

Accordingly, in step S120, to define the first pixel to be evaluated, the pixel row is initially set to l=3, and the pixel column is initially set to k=3. Then, in step S130, the iteration number r is set to 0. The iteration number r represents which one of the 4 daughter pixels of the doubled image $Q^R$ corresponding to the single parent pixel of the undoubled image $P^{R-1}$ is being currently worked upon. In step S135, the daughter pixel $Q_{k,l}$ is selected.

Figure 11A:
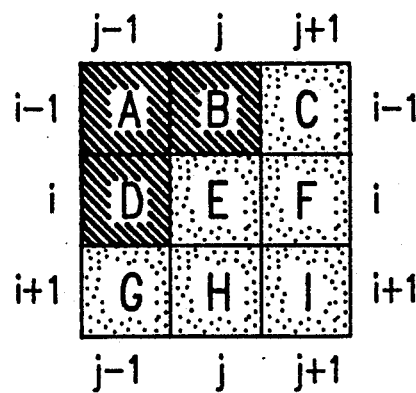
FIGS. 11A–11P illustrate the first preferred embodiment of the smoothing step of the present invention.
Figure 11B:
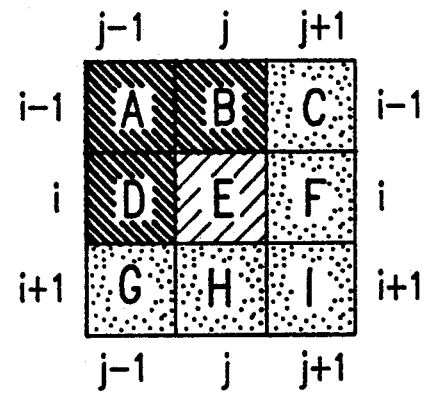
Figure 11C:
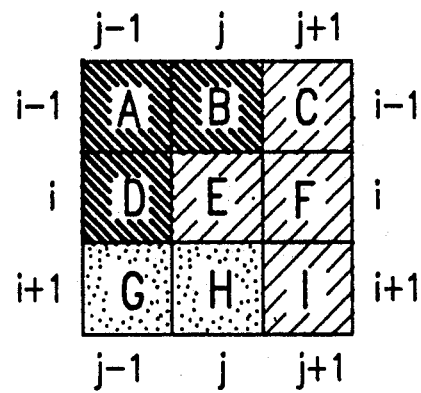
Figure 11D:
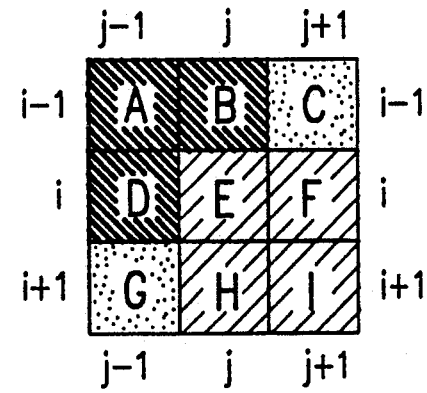
Figure 11E:
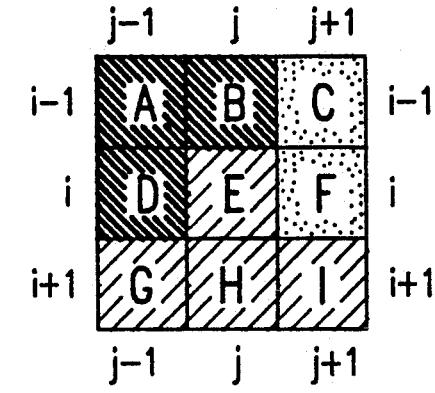
Figure 11F:
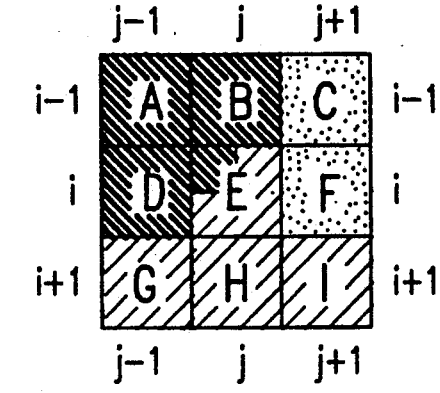

In step S140, the input parent pixel $P_{i,j}$, which corresponds to the selected daughter pixel $Q_{k,l}$, is determined. Daughter pixel $Q_{l,k}$ corresponds to the upper left hand corner of parent pixel $P_{i,j}$. This parent pixel $P_{i,j}$ is defined as pixel E. Then, in step S150, and as shown in FIGS. 10A and 11A–11P, the 8 pixels of the input image surrounding pixel E are determined, such that pixel A is defined as pixel $P_{i-1,j-1}$; pixel B is defined as pixel $P_{i-1,j}$; pixel D is defined as $P_{i,j-1}$; pixel C is defined as pixel $P_{i-1,j+1}$; pixel F is defined as pixel $P_{i,j+1}$; pixel G is defined as pixel $P_{i+1,j-1}$; pixel H is defined as pixel $P_{i+1,j}$; and pixel i is defined as pixel $P_{i+1,j+1}$.

In step S160, the states of pixels A, B, D are determined. If pixels A, B and D have the same state, as shown in FIG. 11A, control jumps to step S170, otherwise control jumps to step S270 (to be described later). In step S170, the state of pixel E is determined. If the state of pixel E is different from the state of pixels A, B, D, as shown in FIG. 11B, control continues to step S180, otherwise control jumps to step S270.

In steps S180–S200, states of pixels C, F, G, H and I are determined. In step S180, as shown in FIG. 11C, if pixels C, F and I have the same state as pixel E, control jumps to step 280, otherwise control continues to step S190. In step S190, as shown in FIG. 11E, if pixels G, H and I are the same state as pixel E, control also jumps to S280, otherwise control continues to step S200. In step S200, as shown in FIG. 11D, if pixels F, H and I have the same state as pixel E, control jumps to step 280, otherwise control continues to step S210.

Figure 11G:
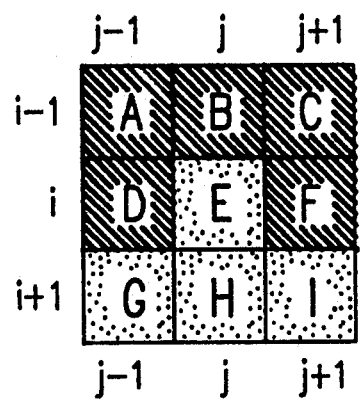
Figure 11H:
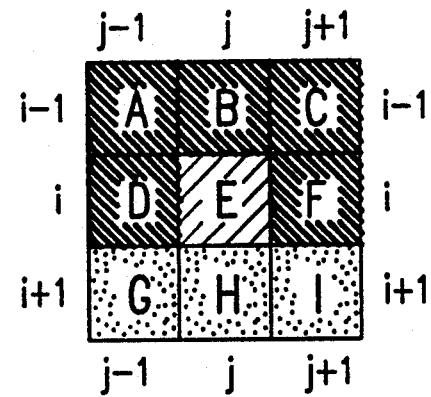
Figure 11I:
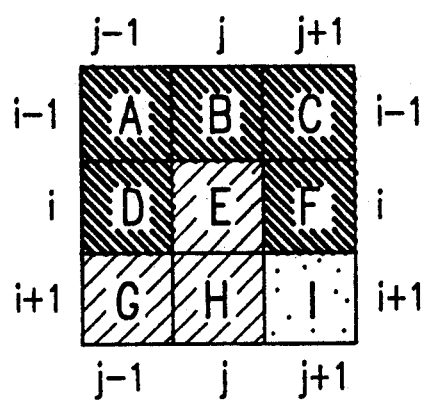
Figure 11J:
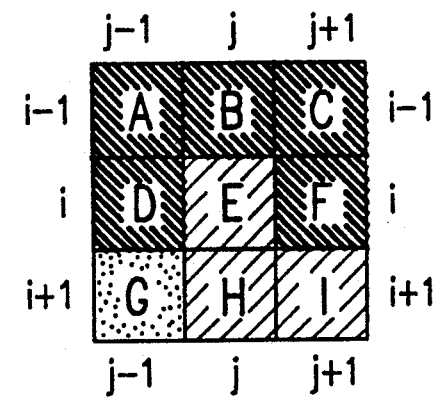
Figure 11K:
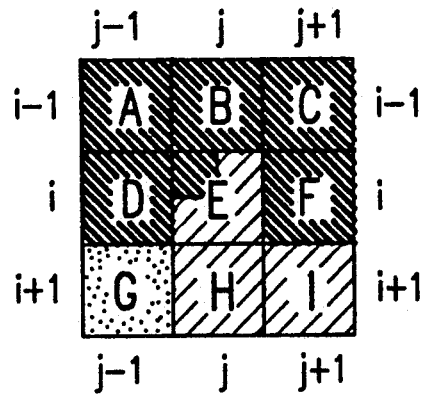
Figure 11L:
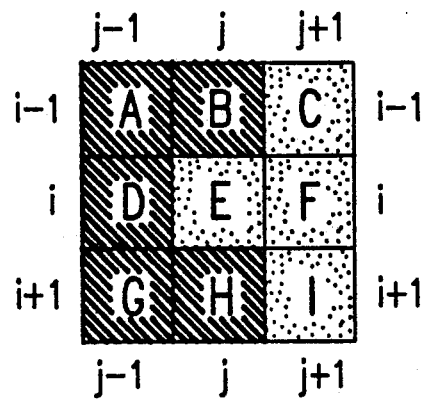
Figure 11M:
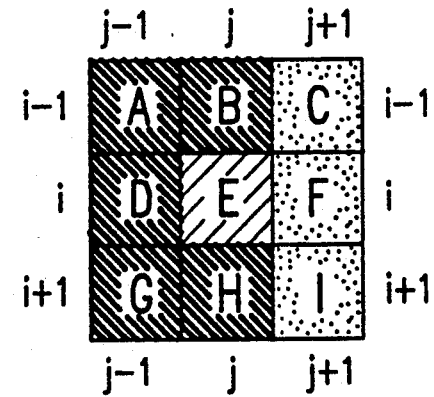
Figure 11N:
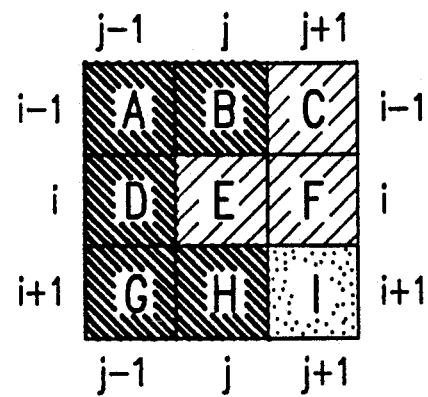
Figure 11O:
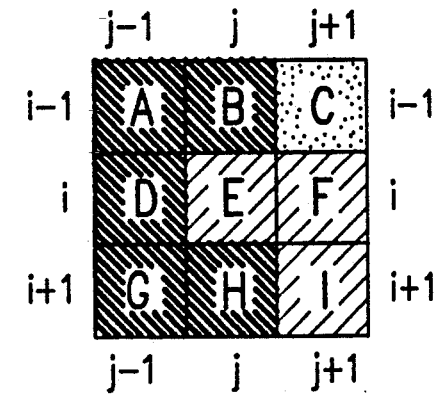
Figure 11P:
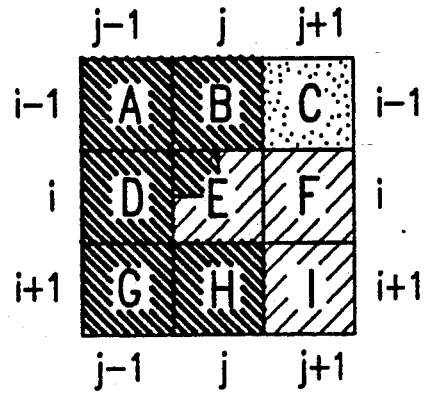

In steps S210–S260, the cases shown in FIGS. 11G–11P are tested for. In step S210 as shown in FIG. 11G, if in addition to pixels A, B and D, pixels C and F have an opposite state as pixel E, control jumps to step S230, otherwise control continues to step S220. In step S220, as shown in FIG. 11I, if in addition to A, B, C, D and F having an opposite state, if pixels G and H have a same state as of pixel E, control jumps to step S270 otherwise control continues to step S250. In step S230, as shown in FIG. 11M, if pixels G and H have the same state as pixel E, control jumps to S280, otherwise control jumps to step S240.

In step S240, as shown in FIG. 11J, if pixels H and I have an opposite state as pixel E, control jumps to step S280, otherwise control jumps to step S270. In step S250, as shown in FIG. 11H, if pixels C and F have the same state as pixel E, control jumps to step S280, otherwise control continues to step S260. In step S260, as shown in FIG. 11O, if pixels F and I have the same state as pixel E, control jumps to step S280, otherwise, control continues to step S270. Step S270 is reached only when none of the tests set forth above return a "true". In step S270, the state of pixel $Q_{k,l}$ is set to the same state as pixel E and control jumps to step S290.

Step S280 is reached upon a determination that one of the above tests returns a "true". In step S280, as shown in FIGS. 11F, 11K and 11P, the state of pixel $Q_{k,l}$ is set to a state opposite that of pixel E. Thereafter, control continues to step S290.

In step S290, the current daughter iteration r is incremented by 1. In step S300, if the daughter iteration number equals 1, indicating daughter pixel $Q_{k,l+1}$, corresponding to the upper righthand corner of parent pixel E, should be evaluated next, control continues to step S310, otherwise control jumps to step S320. In step S320, if the daughter iteration number equals 2, indicating daughter pixel $Q_{k+1,l+1}$, corresponding to the lower righthand corner of parent pixel E should be evaluated next, control continues to step S330, otherwise control jumps to step S340. In step S340, if the daughter iteration number equals 3, indicating daughter pixel $Q_{k+1,l}$, corresponding to the lower lefthand corner of parent pixel E should be evaluated next, control continues to step S350, otherwise control jumps to step S360. Step 360 is reached only after all 4 daughter pixel of the parent pixel E have been evaluated.

In the first variation of the first embodiment, in step S310, the daughter pixel of interest is set to pixel $Q_{k,l+1}$. At the same time, pixel A is set to pixel $P_{i-1,j+1}$; pixel B is set to pixel $P_{i,j+1}$; pixel C is set to pixel $P_{i+1,j+1}$; pixel D is set to pixel $P_{i-1,j}$; pixel F is set to pixel $P_{i+1,j}$; pixel G is set to pixel $P_{i-1,j-1}$; pixel H is set to pixel $P_{i,j-1}$; and pixel I is set to pixel $P_{i+1,j-1}$. This is shown in FIG. 10B, and represents a clockwise rotation about pixel E of 90° from the orientation of FIG. 10A.

In the first variation of the first embodiment, in step S330, the daughter pixel of interest is set to pixel $Q_{k,l+1}$. At the same time, pixel A is set to pixel $P_{i+1,j+1}$; pixel B is set to pixel $P_{i+1,j}$; pixel C is set to pixel $P_{i+1,j-1}$; pixel D is set to pixel $P_{i,j+1}$; pixel F is set to pixel $P_{i,j-1}$; pixel G is set to pixel $P_{i-1,j+1}$; pixel H is set to pixel $P_{i-1,j}$; and pixel I is set to pixel $P_{i-1,j-1}$. This is shown in FIG. 10C, and represents a clockwise rotation about pixel E of 180° from the orientation of FIG. 10A.

In the first variation of the first embodiment, in step S350, the daughter pixel of interest is set to pixel $Q_{k,l+1}$. At the same time, pixel A is set to pixel $P_{i+1,j-1}$; pixel B is set to pixel $P_{i,j-1}$; pixel C is set to pixel $P_{i-1,j-1}$; pixel D is set to pixel $P_{i+1,j}$; pixel F is set to pixel $P_{i-1,j}$; pixel G is set to pixel $P_{i+1,j+1}$; pixel H is set to pixel $P_{i,j+1}$; and pixel I is set to pixel $P_{i-1,j+1}$. This is shown in FIG. 10D, and represents a clockwise rotation about pixel E 270° from the orientation of FIG. 10A.

In the second variation of the first embodiment, as shown in FIG. 7E, in step S310, the daughter pixel of interest is set to pixel $Q_{k,l+1}$. At the same time, pixel A is set to pixel $P_{i-1,j+1}$; pixel B remains at pixel $P_{i-1,j}$; pixel C is set to pixel $P_{i-1,j-1}$; pixel D is set to pixel $P_{i,j+1}$; pixel F is set to pixel $P_{i,j-1}$; pixel G is set to pixel $P_{i+1,j+1}$; pixel H remains at pixel $P_{i+1,j}$; and pixel I is set to pixel $P_{i+1,j-1}$. This is shown in FIG. 10F, and represents a rotation out of the plane of the paper of 180° about the center column from the orientation of FIG. 10E.

In the second variation of the first embodiment, in step S330, the daughter pixel of interest is set to pixel $Q_{k,l+1}$. At the same time, pixel A is set to pixel $P_{i+1,j+1}$; pixel B is set to pixel $P_{i+1,j}$; pixel C is set to pixel $P_{i+1,j-1}$; pixel D is set to pixel $P_{i,j+1}$; pixel F is set to pixel $P_{i,j-1}$; pixel G is set to pixel $P_{i-1,j+1}$; pixel H is set to pixel $P_{i-1,j}$; and pixel I is set to pixel $P_{i-1,j-1}$. This is shown in FIG. 10G, and represents both a rotation of 180° about the center column and a rotation of 180° about the center row from the orientation of FIG. 10E.

In the second variation of the first embodiment, in step S350, the daughter pixel of interest is set to pixel $Q_{k,l+1}$. At the same time, pixel A is set to pixel $P_{i+1,j-1}$; pixel B is set to pixel $P_{i+1,j}$; pixel C is set to pixel $P_{i+1,j+1}$; pixel D is set to pixel $P_{i,j-1}$; pixel F is set to pixel $P_{i,j+1}$; pixel G is set to pixel $P_{i-1,j-1}$; pixel H is set to pixel $P_{i-1,j}$; and pixel I is set to pixel $P_{i-1,j+1}$. This is shown in FIG. 10H, and represents a 180° rotation about the center row from the orientation of FIG. 10E.

In step S360, column indicator I is incremented by 2. In step S370, if I is equal to n−1, indicating the righthand border has been reached, control continues to step S380, otherwise control jumps to step S130. In step S380, the column indicator I is set to 3, indicating the leftmost column of the parent image P and the row indicator k is incremented by 2, indicating the next row of the parent image $P^{r-1}$, and control continues to step S390. In step S390, if k is equal to m−1 indicating the bottom border has been reached, control continues to step S410, otherwise control jumps to step S130. In step S130, the current daughter pixel to be evaluated is set at pixel $Q_{k,l}$ by resetting the daughter iteration number to zero and control is returned to S160. When step S400 is reached, the entire image bitmap plane inside the border has been smoothed, and control returns to step S50.

Figure 8A:
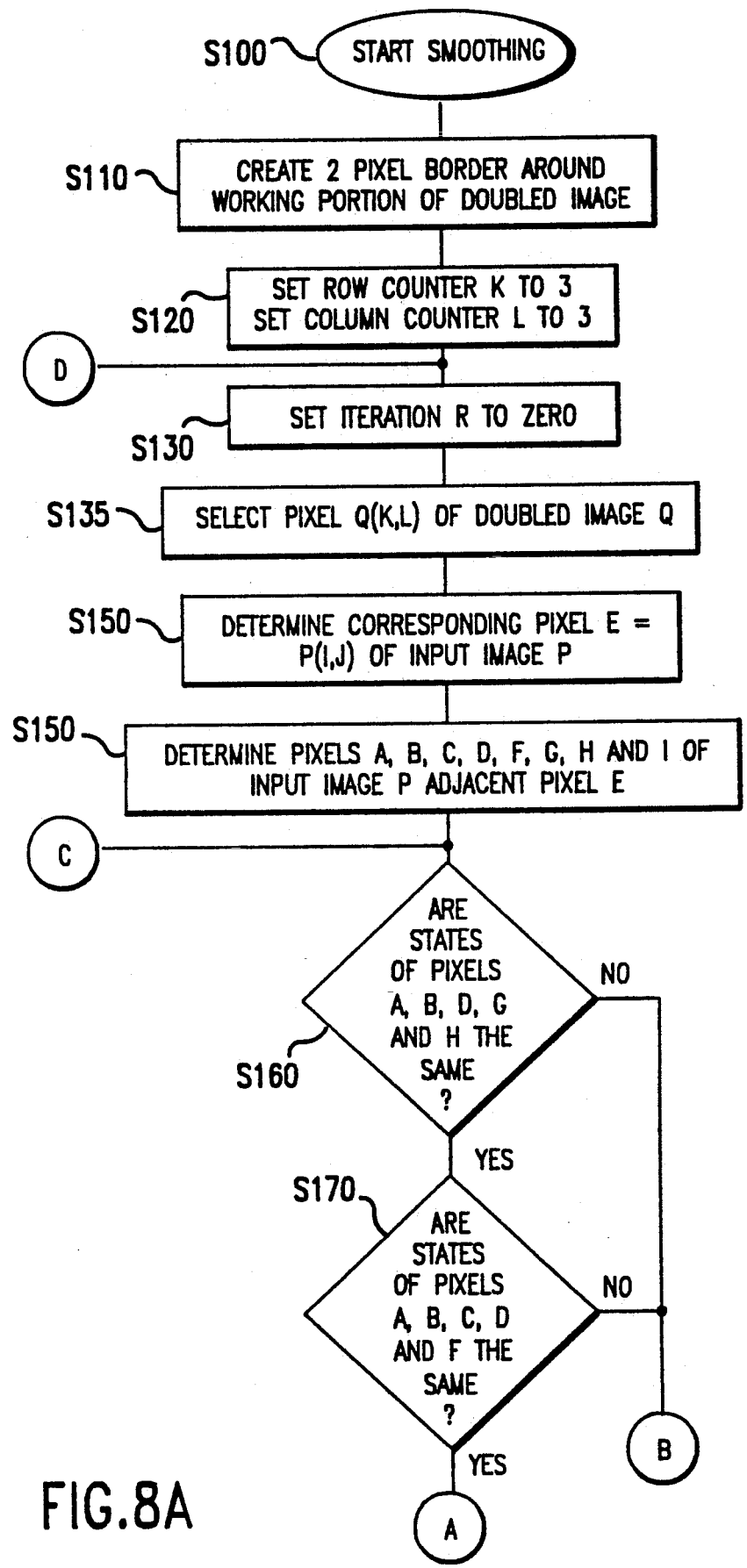
FIGS. 8A–8C and 8D show a flowchart illustrating the second embodiment of the smoothing step of the present invention.
Figure 8B:
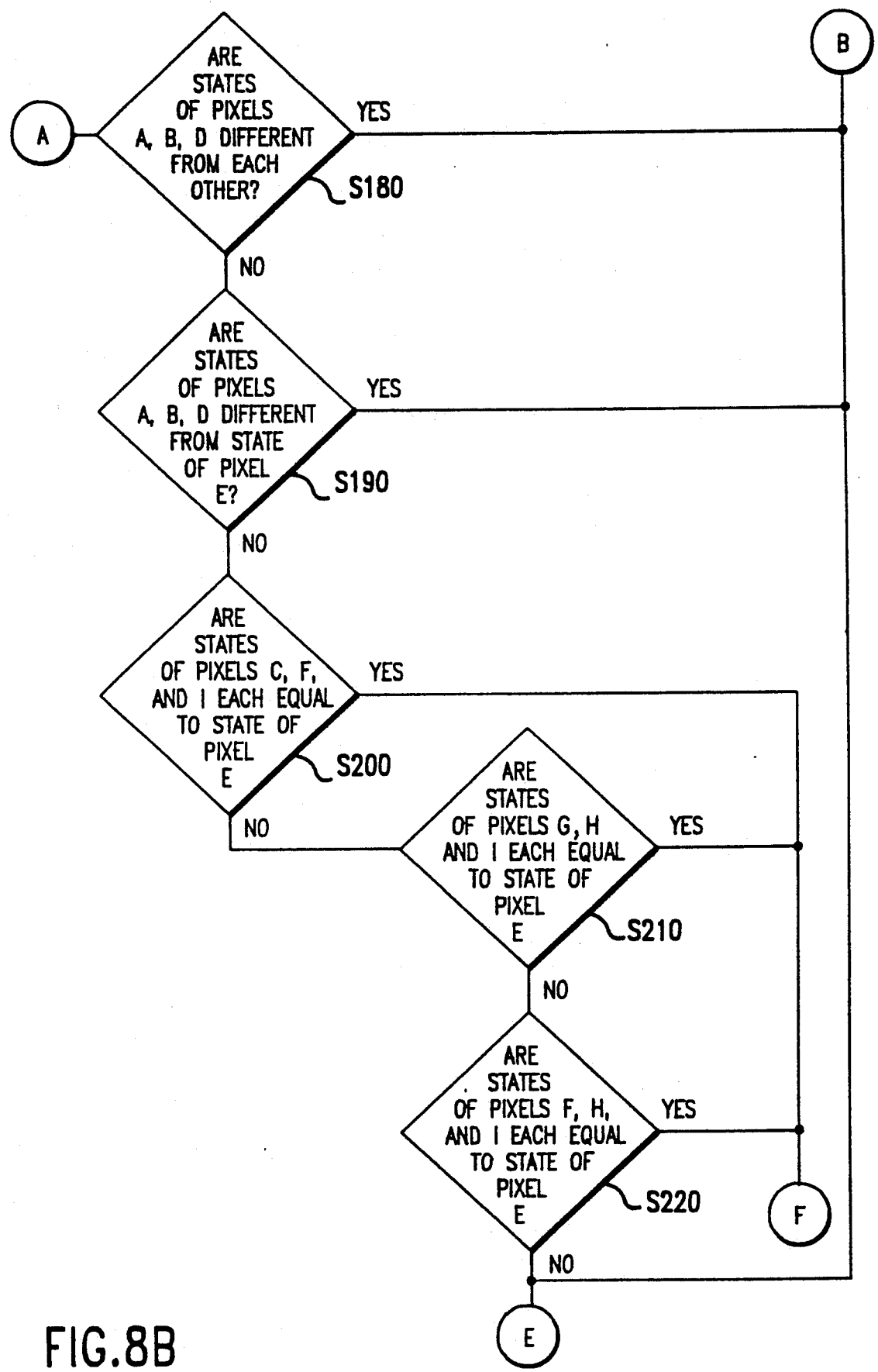
Figure 8C:
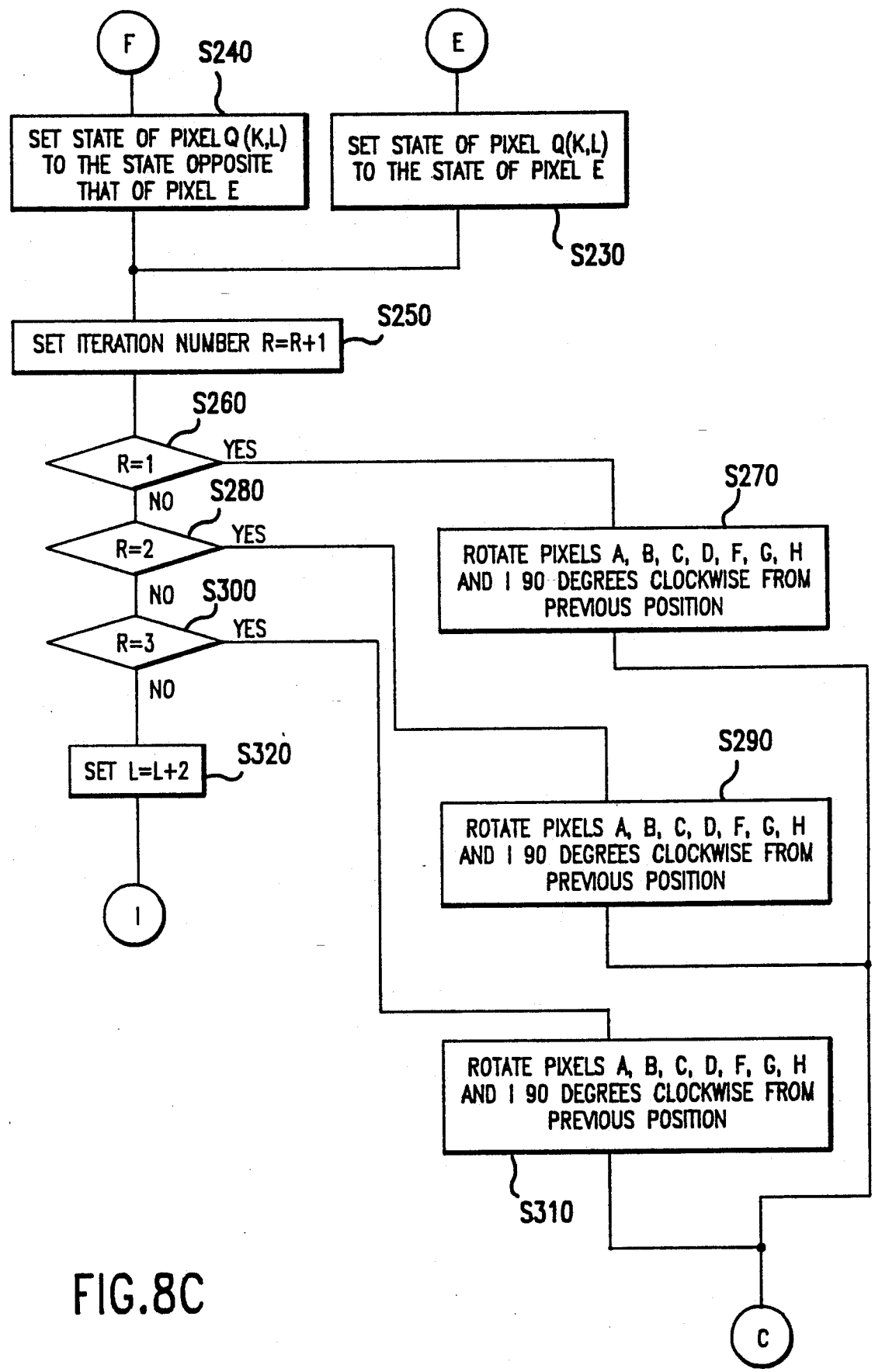
Figure 8D:
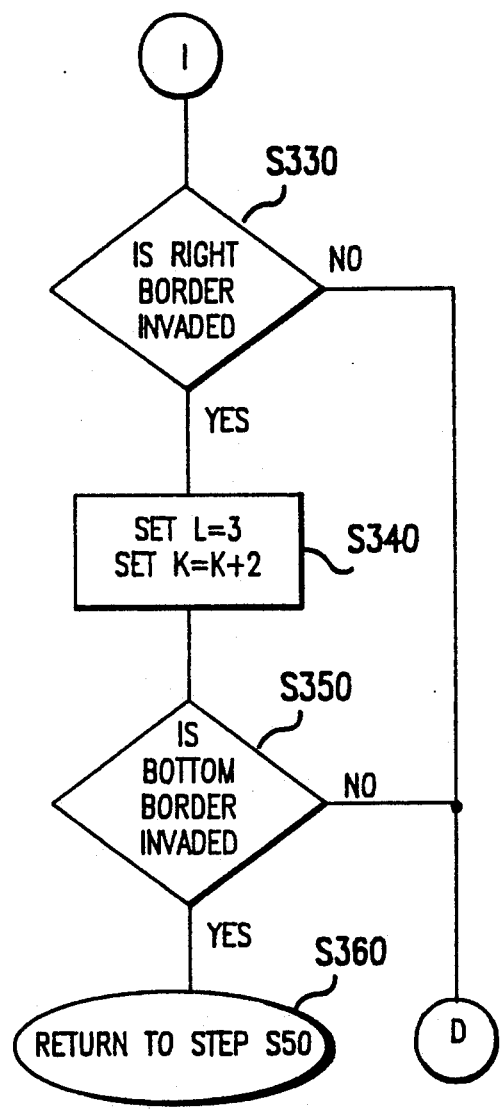

In the second preferred embodiment of the smoothing step, as shown in FIGS. 8A–8C, steps S100–S150, steps S180–S220 and steps S230–S360 are the same as steps s100–S150, steps S170–S200 and steps S270–S410 of the first preferred embodiment, respectively. However, steps S160–S170 of the second preferred embodiment, which are generally the same as the combination of steps S160, S210 and S220 of the first preferred embodiment and test for the cases shown in FIGS. 12A–12D, are performed before, rather than after the steps testing for the cases shown in FIGS. 11A–11P.

In step S160, the states of pixels A, B, D, G and H are determined. If pixels A, B, D, G and H do not have the same state, control continues to step S170, otherwise control jumps to step S230.

Figure 12A:
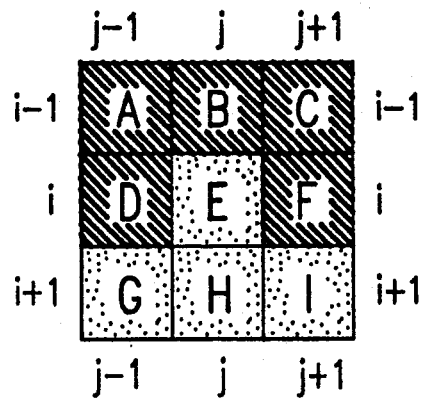
FIGS. 12A–12D illustrate the second preferred embodiment of the smoothing step of the present invention.
Figure 12B:
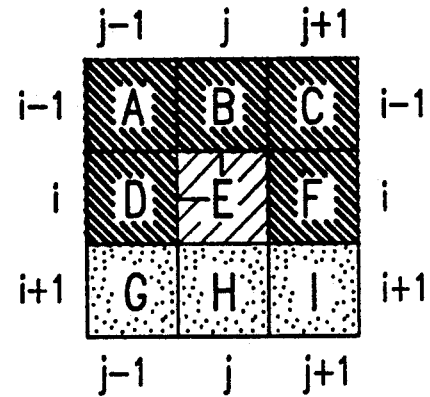
Figure 12C:
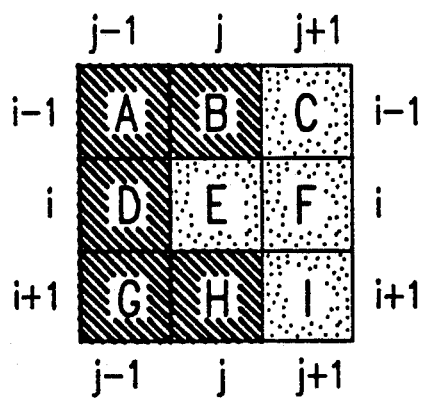
Figure 12D:
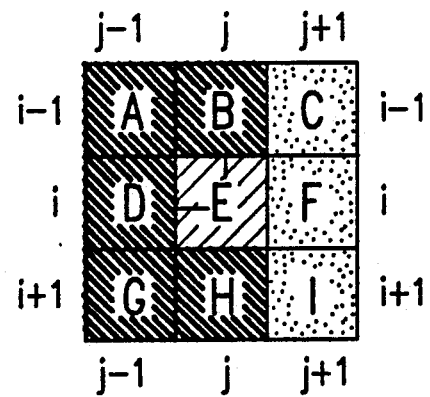
Figure 13:
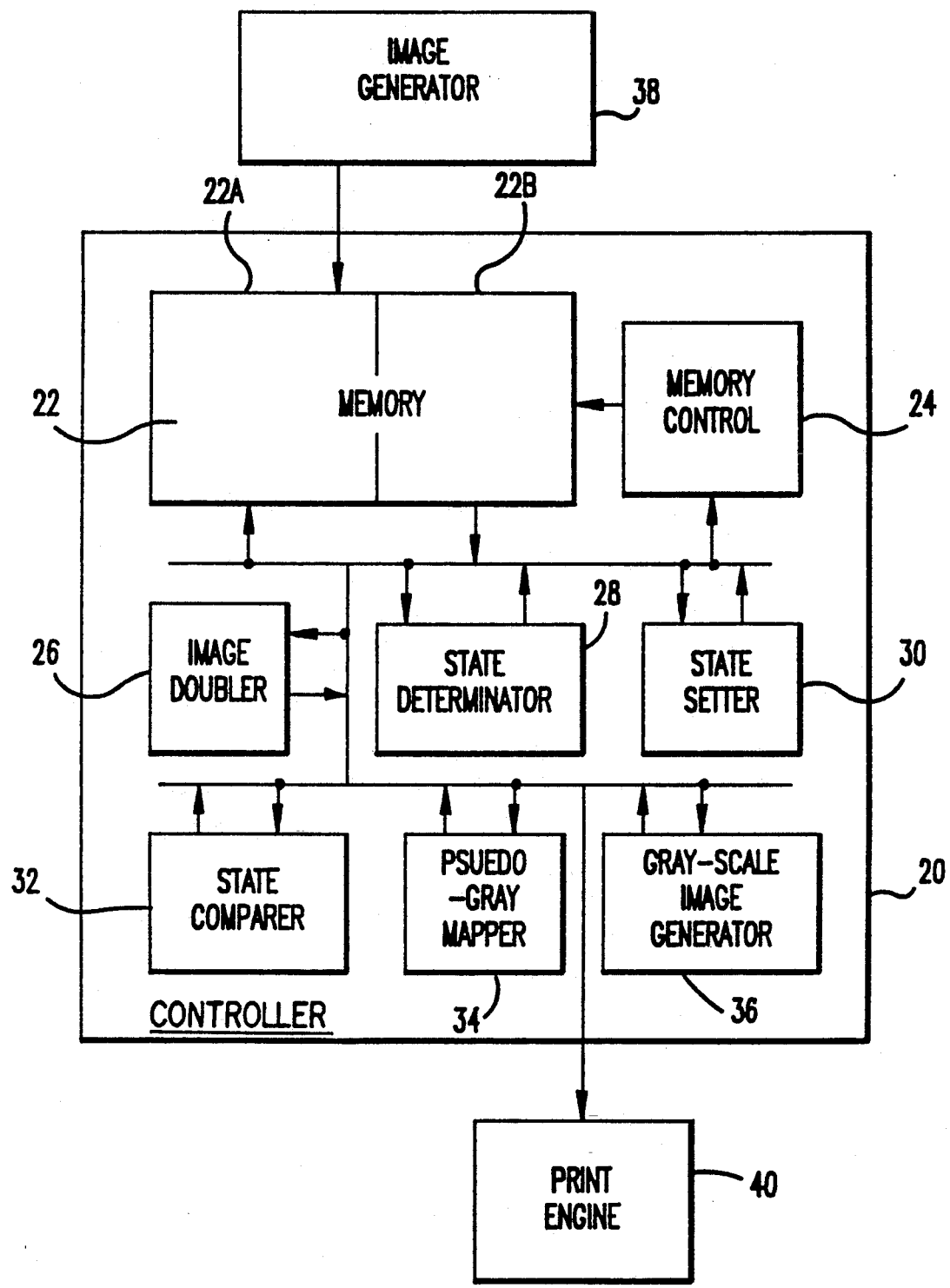
FIG. 13 is a schematic view of the controller of the present invention.

In step S170, the states of pixels A, B, C, D and F are determined. If pixels A, B, C, D and F do not have the same state, as shown in FIG. 12A, control jumps to step S230, otherwise control continues to step S180.

In step S180, the states of pixels A, B, and D only are determined. If pixels A, B and D have the same state, as shown in FIG. 11A control jumps to step S190, otherwise it jumps to step S230. In step S190, the state of pixel E is determined. If the state of pixel E is different from the state of pixels A,B and D, controls continues to step S200, otherwise control jumps to step S230.

In steps S200-S220, states of pixels C, F, G, H and I are determined. In step S200, as shown in FIG. 11C, if pixels C, F and I have the same state as pixel E, control jumps to step S240, otherwise control continues to step S210. In step S210, as shown in FIG. 11E, if pixels G, H and I are the same state as pixel E, control also jumps to S240, otherwise control continues to step S220. In step S220, as shown in FIG. 11D, if pixels F, H and I have the same state as pixel E, control jumps to step S240, otherwise control continues to step S230.

In step S230, the state of pixel $Q_{k,l}$ is set to the same state as pixel E and control jumps to step S250. In step S240, the state of pixel $Q_{k,l}$ is set to a state opposite that of pixel E. Thereafter, control continues to step S250. In step S250, the current iteration number is incremented by 1. In step S260, if the iteration number equals 1, indicating daughter pixel $Q_{k,l+1}$, corresponding to the upper righthand corner of patent pixel E, should be evaluated, control continues to step S270, otherwise control jumps to step S280. In step S280, if iteration number equals 2, indicating daughter pixel $Q_{k+1,l+1}$, corresponding to the lower righthand corner of parent pixel E should be evaluated, control continues to step S290, otherwise control jumps to step S300. In step S300, if the iteration number equals 3, indicating daughter pixel $Q_{k+1,l}$, corresponding to the lower left-hand corner of parent pixel E should be evaluated, control continues to step S310, otherwise control jumps to step S320.

The first variation of the second embodiment is identical to the first variation of the first embodiment. Likewise, the second variation of the second embodiment is identical to the second variation of the first embodiment. Accordingly, steps S270, S290 and S310 of the first variation of the second embodiment are identical to steps S310, S330 and S350, respectively, of the first variation of the first embodiment. Likewise, steps S270, S290 and S310 of the second variation of the second embodiment are identical to steps S310, S330 and S350, respectively, of the second variation of the first embodiment.

The area mapping method of step S70 of the preferred embodiment of the present invention is set forth in the flowchart shown in FIG. 9 and in Eq. (1):

$$P_g(o) = \sum_{j=1}^{n} X_j P_i(j) \tag{1}$$

where, for each pixel o of the output image:

$P_g(o)$ is the pseudo-grey value for the output pixel o obtained by the area mapping conversion;

$P_i(j)$ is the input value of a current input pixel j which intersects the output pixel o;

n is the number of input pixels j which intersect the output pixel o; and $X_j$ in the intersection area, in arbitrary units, between the current input pixel j and the output pixel o.

The intersection area $X_j$ of the input pixel j with the output pixel o is determined by Eq. (2):

$$X_j = A_i(j) \wedge A_o. \tag{2}$$

where:

$A_o$ is the output area, in arbitrary units, of the output pixel o; and $A_i$ is the input area, in arbitrary units, of the input pixels.

The output area $A_o$ and the input area $A_i$ are given by Eqs. (3) and (4):

$$A_o = (R_{ix}/G_x)*(R_{iy}/G_y) \tag{3}$$

$$A_i = (R_{ox}/G_x)*(R_{oy}/G_y) \tag{4}$$

where:

$R_{ox}$ is the output resolution, in dpq, in the x direction;
$R_{oy}$ is the output resolution, in dpq, in the y direction;
$R_{ix}$ is the input resolution, in dpq, in the x direction;
$R_{iy}$ is the input resolution, in dpq, in the y direction;
$G_x$ is the greatest common denominator of the input and output resolutions in the x direction; and
$G_y$ is the greatest common denominator of the input and output resolutions in the y direction.

The pseudo-grey to grey scale conversion of the preferred embodiment of the present invention uses a weighting and thresholding method as set forth in Eq. (5):

$$P_o(o) = \text{Int}[(W*P_g(o) + T)/A_o] \tag{5}$$

where:

W is a grey scale weighing factor;
$P_o(o)$ is the grey scale output value for pixel o;
$P_g(o)$ is the pseudo-grey output value for pixel o;
T is the round-off value; and
$A_o$ is the output area for each output pixel o. The threshold between different values for $P_o(o)$ is controlled by the round-off value T. The round-off value T can have values ranging from 0 to $(A_o - 1)$, depending on the threshold level. However, the round-off value is usually set at $A_o/2$. If the image exposure apparatus is able to output at least two grey scale values, the value of the weighing factor w is given by Eq. (6):

$$W = g - 1 \tag{6}$$

where:

g is the number of possible grey scale values.
However, if the image exposure apparatus can only output a binary (i.e. a black/white) image, $W = 1$.

Accordingly, this step-wise approach for calculating the output image provides additional flexibility in manipulating the bitmap image. It is understood that various enhancement techniques can be added to the general method set forth in FIG. 6 to further improve output image quality.

FIG. 9A shows the flowchart for the area mapping method of step S70 of the present invention. Starting from step S500, in step S510 of the preferred embodiment of the area mapping step, the output resolutions in the x and y directions, $R_{ox}$ and $R_{oy}$, are determined. Likewise, in step S520, the input resolutions of the final intermediate resolution image in the x and y directions, $R_{ix}$ and $R_{iy}$, are determined. Then, in step S530, the greatest common denominator of the input and output resolutions in the x direction, $G_x$, and the greatest common denominator of the input and output resolutions in the y direction, $G_y$, are determined.

Next, in step S540, the output area, $A_o$, of the output pixels is determined, and in step S550 the area of the input pixels of the final intermediate resolution image, $A_i$, is determined. Finally in step 560, the number of output resolution pixels, K, is determined and a counter L is set to one. Next, in steps S570–S600, the pseudo-grey value for each of the output pixels P(L), and ultimately the true grey scale value of each output pixel S(L) is determined for each pixel of the output resolution output image. In step S560, a current output pixel P(L) is selected for converting to a pseudo-grey value.

In step S570, the current output pixel P(L) is selected, and in step S580, the number of final intermediate resolution pixels, p, which intersect the current output pixel P(L) are determined. In step S590, counter o is set to zero, and the pseudo-grey value V(L) of pixel P(L) is set to zero. In step S590 the intersection area ratio between the $o^{th}$ input pixel and the output pixel P(L) is determined. In step S610, the determined intersection area ratio is multiplied by the state value of the $o^{th}$ pixel to get the intersection value. The intersection value for the $o^{th}$ input pixel is summed as a total gray scale value V(L) for the current output pixel P(L) in step S620 and the counter o is incremented in step S630. In step S640 a determination is made whether the value of counter o is greater than the number p of intersecting final intermediate resolution pixels. If not, control returns to step S600 and the intersection area ratio and value of the next $o^{th}$ pixel is determined. However, if in step S640, the number of intersecting pixels p is exceeded, indicating all of the intersecting input resolution pixels o have been evaluated, the total of the intersection values for the current output pixel P(L) is defined as the pseudo-grey value V(L) for the current output resolution pixel P(L), and control continues to step S650.

In step 650, the pixel counter L is incremented. In step S660, a determination is made whether the L counter exceeds the number of output resolution pixels K. If not, control jumps to step S570, otherwise control continues to step S670. In step 670, which is reached only after the entire intermediate resolution image has been area mapped to create the output resolution pseudo-grey image, any additional desired post-processing operations are performed. Then, in step S680, control is returned to step S70.

Figure 9B:
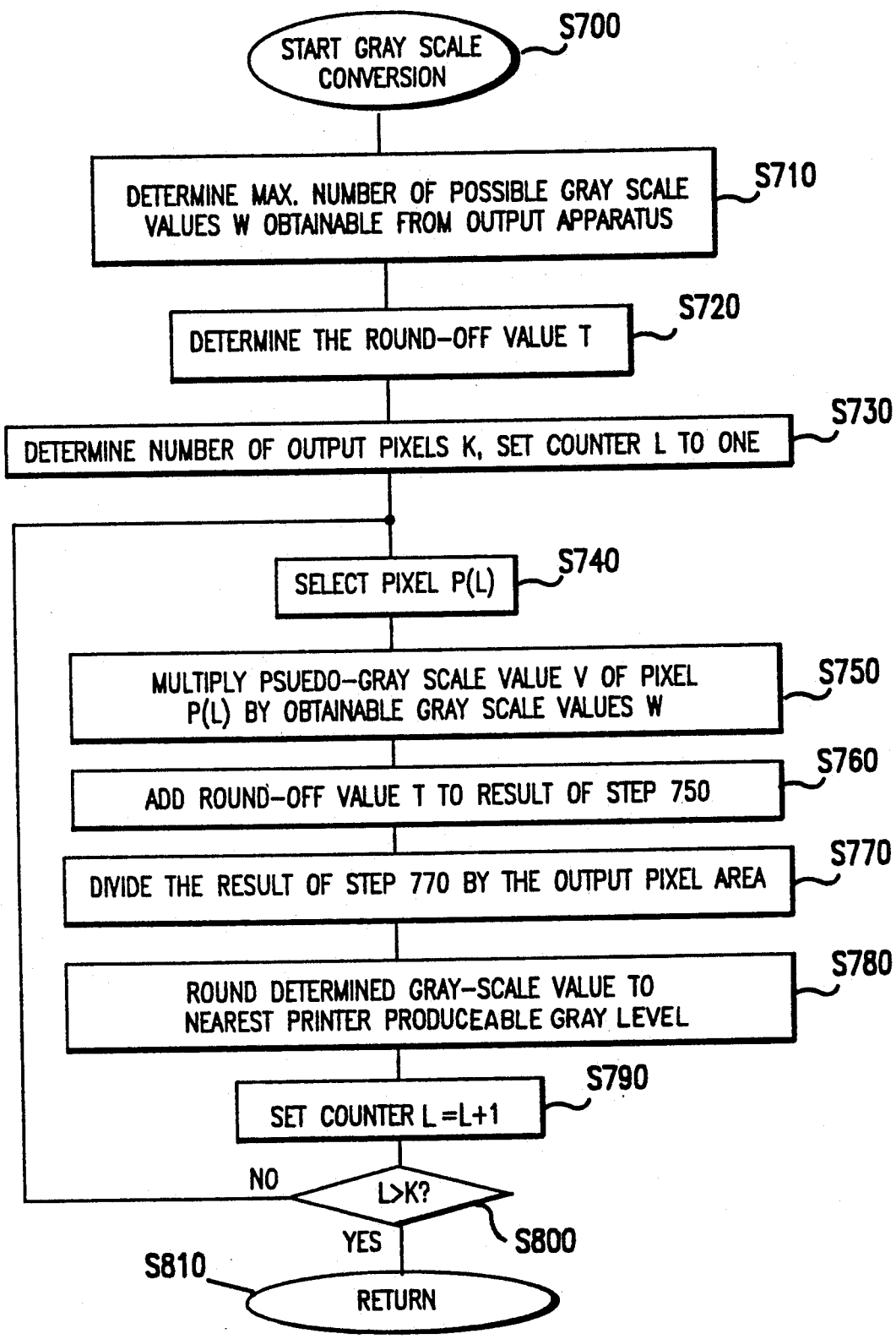

FIG. 9B shows the flowchart for the pseudo-grey to grey scale conversion of step S80. Starting from step S700, step S710 determines the maximum number of possible grey levels W obtainable from the particular image output apparatus to be used to output the grey scale output image. In step S720, the roundoff value T is determined. In step S730, the number of output resolution pixels K is again determined, and the counter L is set to one. In step S740, the current output resolution pixel P(L) is selected. Then, in step S750, the pseudo-grey value, V(L), is determined by the summation step S620 of FIG. 9A, is multiplied by the number of obtainable grey levels W. In step S760, the roundoff value T is added to the value determined in step S750. Then, in step S770, the value determined in step S760 is divided by the output pixel area $A_o$. In step S780, the value in step S770 is rounded down to the nearest integer value and is defined as the grey scale value S(L) for the current output resolution output pixel P(L). Then in step S790, the counter L is incremented by one. In step S800, a determination is made witherthe L counter exceeds the number of output resolution pixels K. If so, control continues to step 810 which returns controls to step S80. If not, control jumps back to step S740.

In operation, the resolution conversion method of the present invention is performed by a controller, which can be incorporated into an image output apparatus, such as a printer or the like, or into an image generating device, such as a scanner, a copier or a general purpose computer.

The controller 20 comprises a memory 22 having two portions 22A and 22B. The first portion 22A of the memory 22 stores an original image I, and the intermediate, doubled image Q of each even-numbered iteration 2r. The second portion 22B of the memory 22 stores the intermediate, doubled image Q of each odd-numbered iteration 2r−1. Either portion 22A or 22B of the memory 22 can be used to store the pseudo-grey image $S_g$ and grey scale image $S_o$. The controller 20 also comprises a memory control means 24 for controlling the transfer of images I, Q and S between the first and second portions 22A and 22B of the memory 22.

Additionally, the controller 24 comprises a image doubling means 26 for converting a previous image I or $Q^{r-1}$ having a first resolution to a current image $Q^r$ having a second resolution double the first resolution, a state determination means 28 for determining the state of the parent pixels A−I of the various images, and a state setting means 30 for setting the state of the daughter pixels of the parent pixel E. The controller 20 also comprises state comparing means 32 for comparing the states of pixels A−I to one another.

Finally, the controller 20 comprises a mapping means 34 for generating the pseudo-grey image $S_g$, and a grey scale image generating means 36 for generating and outputting the grey scale, resolution-converted, output image $S_o$.

While the present invention has been described in connection with the preferred embodiment, it will be understood that it is not intended to limit the invention to this embodiment. On the contrary, it is intended to cover all alternatives, modifications and equivalents as may be included within the spirit and scope of the invention as defined by the appended claims.

What is claimed is:

1. A method for converting an input image to an output image to be output by an image exposure apparatus, comprising the steps of:
   (a) determining an input resolution of the input image;
   (b) doubling the input resolution of the input image of the determined input resolution to obtain an intermediate resolution image;
   (c) smoothing the intermediate resolution image;
   (d) determining if the resolution of the intermediate resolution image is greater than a desired output resolution;
   (e) repeating steps b–d using the intermediate resolution image as the input image until the output resolution of the image is greater than the desired resolution; and
   (f) generating the output image by reducing the resolution of the intermediate image to the desired output resolution.

2. A method for converting an input image to an output image to be output by an image exposure apparatus, comprising the steps of:
   (a) determining an input resolution of the input image;
   (b) doubling the determined input resolution of the input image to obtain an intermediate resolution image;
   (c) smoothing the intermediate resolution image;
   (d) determining if the resolution of the intermediate resolution image is greater than a desired output resolution;
   (e) repeating the steps b–d using the intermediate resolution image as the input image until the intermediate resolution of the image is greater than the desired output resolution; and (f) generating the output image by reducing the resolution of the intermediate image to the desired output resolution;

wherein the step of reducing the resolution of the intermediate resolution image comprises the step of area mapping the intermediate resolution image.

3. The method of claim 2, wherein the step of area mapping comprises the steps of:
converting the intermediate resolution image to a pseudo-grey image; and
converting the pseudo-grey image to one of a grey scale output image and a binary image.

4. The method of claim 2, wherein the step of area mapping further comprises the step of improving the pseudo-grey image using at least one of the steps of error diffusion, medium filtering, high pass filtering, low pass filtering and averaging.

5. The method of claim 2, wherein the conversion from a pseudo-grey image to a full grey-scale output image is determined by:

$$P_o(i) = \text{Int}((W^*P_g(i)+T)/A_o)$$

where:
Int is an integer rounding function;
$P_o(i)$ is an output pixel value for output pixel i;
$P_g(i)$ is the pseudo-grey value for output pixel i;
T is a round-off value;
$A_o$ is an output area of output pixel i; and
W is a weighing factor.

6. The method of claim 5, wherein when the weighing factor W is equal to 1, the true grey scale collapses to a binary conversion.

7. The method of claim 5, wherein the round-off value T ranges between 0 and $A_o-1$.

8. The method of claim 7, wherein the round-off value T is equal to $A_o/2$.

9. The method of claim 2, wherein pseudo-grey image is determined from the intermediate resolution image by:

$$P_g(o) = \sum_{j=1}^{n} X_j P_i(j)$$

where:
$P_g$ is the pseudo-grey value of an output pixel o;
$P_i$ is the binary value of an input pixel j;
$X_j$ is an area of intersection between an intersection input pixel j and the output pixel o; and
n is a number of the input pixels intersecting the output pixel o.

10. The method of claim 9, wherein the area of intersection between the input pixel j and the output pixel o, $X_j$, is determined by:

$$A_j = A_i(j) \wedge A_o$$

where:
$A_o$ is an area of the output pixel o; and
$A_i(j)$ is an area $A_j$ of the $j^{th}$ input pixel.

11. The method of claim 10, wherein the area of the output pixel o, $A_o$, is determined by:

$$A_o = (R_{ix}/G_x)^*(R_{iy}/G_y)$$

where $R_{ix}$ is an input resolution in a first direction;
$R_{iy}$ is an input resolution in a second direction orthogonal to the first direction;
$G_x$ is a greatest common denominator of the input resolution in the first direction and an output resolution in the first direction; and
$G_y$ is a greatest common denominator of the input resolution in the second direction and an output resolution in the second direction.

12. The method of claim 10, wherein the area of the input pixel, $A_i$, is determined by:

$$A_i = (R_{ox}/G_x)^*(R_{oy}/G_y)$$

where:
$R_{ox}$ is an output resolution in a first direction;
$R_{oy}$ is an output resolution in a second direction orthogonal to the first direction;
$G_x$ is a greatest common denominator of the input resolution in the first direction and an output resolution in the first direction; and
$G_y$ is a greatest common denominator of the input resolution in the second direction and an output resolution in the second direction.

13. A method for converting an input image to an output image to be output by an image exposure apparatus, comprising the steps of:
(a) determining an input resolution of the input image;
(b) doubling the determined input resolution of the input image to obtain an intermediate resolution image;
(c) smoothing the intermediate resolution image;
(d) determining if the resolution of the intermediate resolution image is greater than a desired output resolution;
(e) repeating the steps b-d using the intermediate resolution image as the input image until the intermediate resolution of the image is greater than the desired resolution; and
(f) generating the output image by reducing the resolution of the intermediate image to the desired output resolution;

wherein the step of smoothing comprises the steps of:
selecting an intermediate resolution pixel of the intermediate resolution image;
determining an input resolution pixel E of the input image corresponding to the selected intermediate resolution pixel;
determining a location within the corresponding input resolution pixel corresponding to the selected intermediate resolution pixel;
selecting eight input resolution pixels A-D and F-I adjacent the determined input resolution pixel;
determining a state of the corresponding input pixel E;
determining states of the adjacent pixels A-D and F-I; and
determining a state of the intermediate resolution pixel based on the determined states of pixels A-I.

14. The method of claim 13, wherein the step of determining the state of the intermediate pixel comprises the steps of:
determining the states of pixels A, B and D;
determining the states of pixels G and H;
determining the states of pixels C and F;
determining the states of pixel I; and
setting the state of the intermediate pixel to a state opposite that of pixel E if the states of pixels A, B and D are each different from the state of pixel E, and at least one of the groups, comprising pixels C, F and I each being the same state as pixel E, pixels G, H and I each being the same state as pixel E, pixels F, G and H each being the same state as pixel E, pixels C and F each being a different state from pixel E and one of the groups of pixels G and H and pixels H and I each being the same as pixel E, and pixels G and H each being a different state from pixel E and at least one of the groups of pixels C and F and pixels F and I each being the same state as pixel E, is present;

otherwise, setting the state of the intermediate pixel to a same state as pixel E.

15. The method of claim 13, wherein the step of determining the state of the intermediate pixel comprises the steps of:

determining the states of pixels A, B and D;
determining the states of pixels G and H;
determining the states of pixels C and F;
determining the states of pixel I; and setting the state of the intermediate pixel to a same state as pixel E if the states of pixels A, B and D are each different from the state of pixel E, and at least one of the groups, comprising pixels C and F each being a different state from pixel E and one of the groups of pixels G and H and pixels H and I each being the same as pixel E, and pixels G and H each being a different state from pixel E and at least one of the groups of pixels C and F and pixels F and I each being the same state as pixel E, is present; otherwise, setting the state of the intermediate pixel to an opposite state as pixel E if the states of pixels A, B and D are each different from the state of pixel E, and at least one of the groups, comprising pixels C, F and I each being the same state as pixel E, pixels G, H and I each being the same state as pixel E, and pixels F, G and H each being the same state as pixel E, is present; otherwise setting the state of the intermediate pixel to the same state as pixel E.

* * * * *